(12) United States Patent
Tang et al.

(10) Patent No.: US 11,502,602 B2
(45) Date of Patent: Nov. 15, 2022

(54) MULTI-DIMENSIONAL PULSE WIDTH MODULATION CONTROL

(71) Applicant: Infineon Technologies Austria AG, Villach (AT)

(72) Inventors: Benjamim Tang, Rancho Palos Verdes, CA (US); Todd Bellefeuille, Georgetown, MA (US); Bikiran Goswami, Burlington, MA (US); Kang Peng, East Greenwich, CT (US); Venkat Sreenivas, Winchester, MA (US)

(73) Assignee: Infineon Technologies Austria AG, Villach (AT)

( * ) Notice: Subject to any disclaimer, the term of this patent is extended or adjusted under 35 U.S.C. 154(b) by 111 days.

(21) Appl. No.: 17/070,293

(22) Filed: Oct. 14, 2020

(65) Prior Publication Data

US 2022/0115954 A1 Apr. 14, 2022

(51) Int. Cl.
*H02M 3/157* (2006.01)
*H02M 3/156* (2006.01)
*H02M 3/158* (2006.01)

(52) U.S. Cl.
CPC .......... *H02M 3/1566* (2021.05); *H02M 3/157* (2013.01); *H02M 3/1584* (2013.01)

(58) Field of Classification Search
CPC ...... H02M 1/08; H02M 3/156; H02M 3/1566; H02M 3/157; H02M 3/1584
See application file for complete search history.

(56) References Cited

U.S. PATENT DOCUMENTS

| 6,795,009 | B2 | 9/2004 | Duffy et al. |
| 7,239,116 | B2 | 7/2007 | Tang |
| 7,573,245 | B2 | 8/2009 | Schuellein |
| 8,159,197 | B2 | 4/2012 | Cheng et al. |
| 8,525,502 | B2 * | 9/2013 | Weinstein ............... H02M 1/44 323/283 |
| 8,803,499 | B2 | 8/2014 | Sreenivas et al. |
| 8,878,581 | B2 | 11/2014 | Kris |
| 8,907,643 | B2 | 12/2014 | Sreenivas et al. |
| 8,917,073 | B2 | 12/2014 | Yang et al. |
| 9,438,117 | B2 | 9/2016 | Sreenivas |
| 10,635,124 | B2 | 4/2020 | Mahajan et al. |
| 2008/0225938 | A1* | 9/2008 | Prodic ..................... H03K 9/06 375/238 |

(Continued)

FOREIGN PATENT DOCUMENTS

| CN | 111600464 A | 8/2020 |
| WO | 2020166451 A1 | 8/2020 |

OTHER PUBLICATIONS

European Search Report, EP 21 20 1381, dated Feb. 17, 2022, pp. 1-9.

*Primary Examiner* — Alex Torres-Rivera
(74) *Attorney, Agent, or Firm* — Armis IP Law, LLC

(57) ABSTRACT

An apparatus includes a controller that monitors an error voltage indicating a difference between an output voltage and a setpoint voltage. Based on the monitored error voltage, the controller generates modulation adjustment signals including a frequency adjustment signal and an ON-time adjustment signal. The controller modulates a pulse width modulation signal of a first power supply phase in accordance with both the frequency modulation adjustment signal and the ON-time adjustment signal.

34 Claims, 11 Drawing Sheets

(56) References Cited

U.S. PATENT DOCUMENTS

| | | | |
|---|---|---|---|
| 2011/0109291 A1* | 5/2011 | Tang | H02M 3/156 |
| | | | 323/282 |
| 2012/0194162 A1* | 8/2012 | Lin | H02M 1/14 |
| | | | 323/304 |
| 2013/0201738 A1 | 8/2013 | Harrison et al. | |
| 2014/0002042 A1* | 1/2014 | Wismar | H02M 3/157 |
| | | | 323/282 |
| 2018/0019654 A1 | 1/2018 | Higashi | |
| 2018/0351452 A1* | 12/2018 | Clavette | H02M 3/158 |
| 2020/0112202 A1 | 4/2020 | Li et al. | |
| 2020/0395854 A1* | 12/2020 | Yao | G01R 19/175 |
| 2021/0159789 A1* | 5/2021 | Hsu | H02M 3/158 |

* cited by examiner

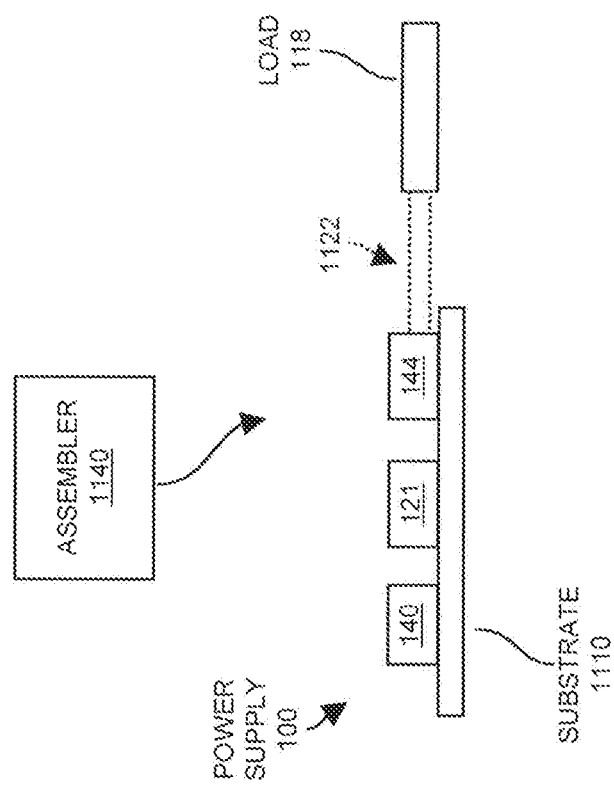

MULTI-DIMENSIONAL PULSE WIDTH MODULATION CONTROL

BACKGROUND

In a conventional Fixed Frequency PWM controller (Digital Controller, PID based voltage mode with Vin Feedforward), Vtarget is the regulator's target output voltage, adjusted for the feedback ratio of the voltage sensor. Verror is the error voltage, such as the difference between the feedback voltage and target voltage. A feed forward module provides feedforward computation of the nominal duty cycle ratio D0, based on measured, estimated, or fixed Vin.

A respective Pulse width modulator (PWM) converts a received control signal and produces a pulse width modulation signal. This results in a PWM signal at a fixed frequency of F0, with variable duty cycle D responsive to the error voltage. The feedback loop thus tries to reduce the error voltage, such that the output voltage matches Vtarget, adjusted for the ratio of the voltage sensor.

BRIEF DESCRIPTION

Embodiments herein include novel ways of improving generation of a respective output voltage.

For example, general embodiments herein include controlling the relationship between simultaneously adjusting Ton (ON-time) and Fsw (switching frequency) of a respective pulse width modulation signal as a response to the control system regulating the output voltage.

In one embodiment, this is achieved via a relationship between duty cycle (the basis for PWM modulation) and the pulse width Ton and switching frequency Fsw. The effective Duty cycle modulation is a function of the Ton modulation and the Fsw modulation. Embodiments herein implement a novel regulator/controller via linear and non-linear closed loop methods.

For example, embodiments herein include a voltage regulator (such as digital multidimensional PWM controller), where both the pulse width Ton, and the pulse frequency Fsw are continuously adjusted, resulting in an effective duty cycle of Deff=Ton*Fsw, hence "multidimensional" PWM control.

More specifically, embodiments herein include an apparatus and/or system including a controller. The controller monitors an error voltage indicating a difference between an output voltage and a setpoint voltage (reference or target voltage). Based on the monitored error voltage, the controller generates modulation adjustment signals including a frequency adjustment signal and an ON-time adjustment signal. The controller modulates a pulse width modulation signal of a first power supply phase in accordance with both the frequency modulation adjustment signal and the ON-time adjustment signal.

In accordance with further example embodiments, the controller generates the modulation adjustment signals based on a magnitude of the error voltage. Additionally, or alternatively, the controller generates the modulation adjustment signals based on a frequency of the error voltage.

Further embodiments herein include, via the controller, implementation of a first gain transfer function and a second gain transfer function. The first gain transfer function converts the monitored error voltage into the frequency adjustment signal. The second gain transfer function converts the monitored error voltage into the ON-time adjustment signal.

In still further example embodiments, the first gain transfer function and the second gain transfer function are correlated to each other to generate the pulse width modulation signal at different desired effective duty cycles over a range of different magnitudes and/or frequencies of the error voltages.

Yet further embodiments herein include, via the controller, simultaneously: i) adjusting a frequency of the pulse width modulation signal based on the frequency adjustment signal, and ii) adjusting an ON-time of the pulse width modulation signal based on the ON-time adjustment signal.

In accordance with further example embodiments, the controller: i) generates a nominal frequency signal to which the frequency adjustment signal is applied to produce a frequency setting at which to generate the pulse width modulation signal; and ii) generates a nominal ON time signal to which the ON-time adjustment signal is applied to produce an ON-time setting of the pulse width modulation signal.

In further example embodiments, the power supply as described herein includes multiple phases. The controller produces modulation adjustment signals (modulation control signals) for each phase of the multiple phases.

For example, based on the error voltage, the controller produces first modulation adjustment signals such as a first frequency adjustment signal (such as one or more modulation control signals) and a first ON-time adjustment signal (such as one or more modulation control signals) for the first power supply phase; based on the error voltage, the controller produces second modulation adjustment signals such as a second frequency adjustment signal (such as one or more modulation control signals) and a second ON-time adjustment signal (such as one or more modulation control signals) for a second power supply phase; based on the error voltage, the controller produces third modulation adjustment signals such as a third frequency adjustment signal (such as one or more modulation control signals) and a third ON-time adjustment signal (such as one or more modulation control signals) for the third power supply phase; and so on. Alternatively, the frequency adjustment signal can be shared by all phases, but operated at a fixed phase offset to obtain phase interleaving, whereas the ON time adjustment signal can be independently controlled for each phase.

In further example embodiments, the controller includes one or more PID control functions. The PID implements a frequency dependent gain that generates a modulation adjustment signal based on the error voltage. The modulation adjustment signal may be a target duty cycle signal in the case of a voltage mode controller. The modulation adjustment signal may be a target current signal in the case of a current mode controller. In such an instance, the controller further converts the current target signal into the modulation adjustment signals based on the phase current feedback.

In one nonlimiting example embodiment, the controller includes a PID control function that produces a duty cycle control signal from the monitored error voltage. The controller implements one or more map functions (such as linear and/or non-linear) to convert the duty cycle control signal into the modulation adjustment signals that are used to modulate the pulse width modulation signal.

Further embodiments herein include, via the controller: i) generating an ON-time setting or signal from the ON-time adjustment signal, ii) generating a switching frequency setting or signal from the frequency adjustment signal, and iii) modulating the pulse width modulation signal via a combination of the ON-time setting or signal and the switching frequency setting or signal.

In still further example embodiments, the controller includes or implements an accumulator that monitors passage of a period (such as via averaging) of the switching frequency signal. In one embodiment, the controller restarts the pulse width modulation signal in response to a result produced by comparing an output of the accumulator to a threshold signal, which indicates completion of the switching period.

In still further example embodiments, the controller is further operative to i) adjust an ON-time of the pulse width modulation signal based on the ON-time adjustment signal until it reaches a specified maximum value, and ii) adjust a frequency of the pulse width modulation signal based on the frequency adjustment signal if the ON time has reached a specified maximum value.

In accordance with further example embodiments, the controller as described herein includes a PID controller operative to produce a target duty cycle, the controller is further operative to convert the target duty cycle into the modulation adjustment signals.

These and other more specific embodiments are disclosed in more detail below.

Embodiments herein are useful over conventional techniques. For example, embodiments herein include.

Note that although embodiments as discussed herein are applicable to power and voltage generation, the concepts disclosed herein may be advantageously applied in any suitable application.

Note further that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: monitor an error voltage indicating a difference between an output voltage and a setpoint voltage; based on the monitored error voltage, generate modulation adjustment signals including a frequency adjustment signal and an ON-time adjustment signal; and modulate a pulse width modulation signal of a first power supply phase in accordance with the both frequency modulation adjustment signal and the ON-time adjustment signal.

The ordering of the steps above has been added for clarity sake. Note that any of the processing operations as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of generating one or more output voltages to power a load. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 11 is an example diagram illustrating assembly of a circuit according to embodiments herein.

Figure 1:
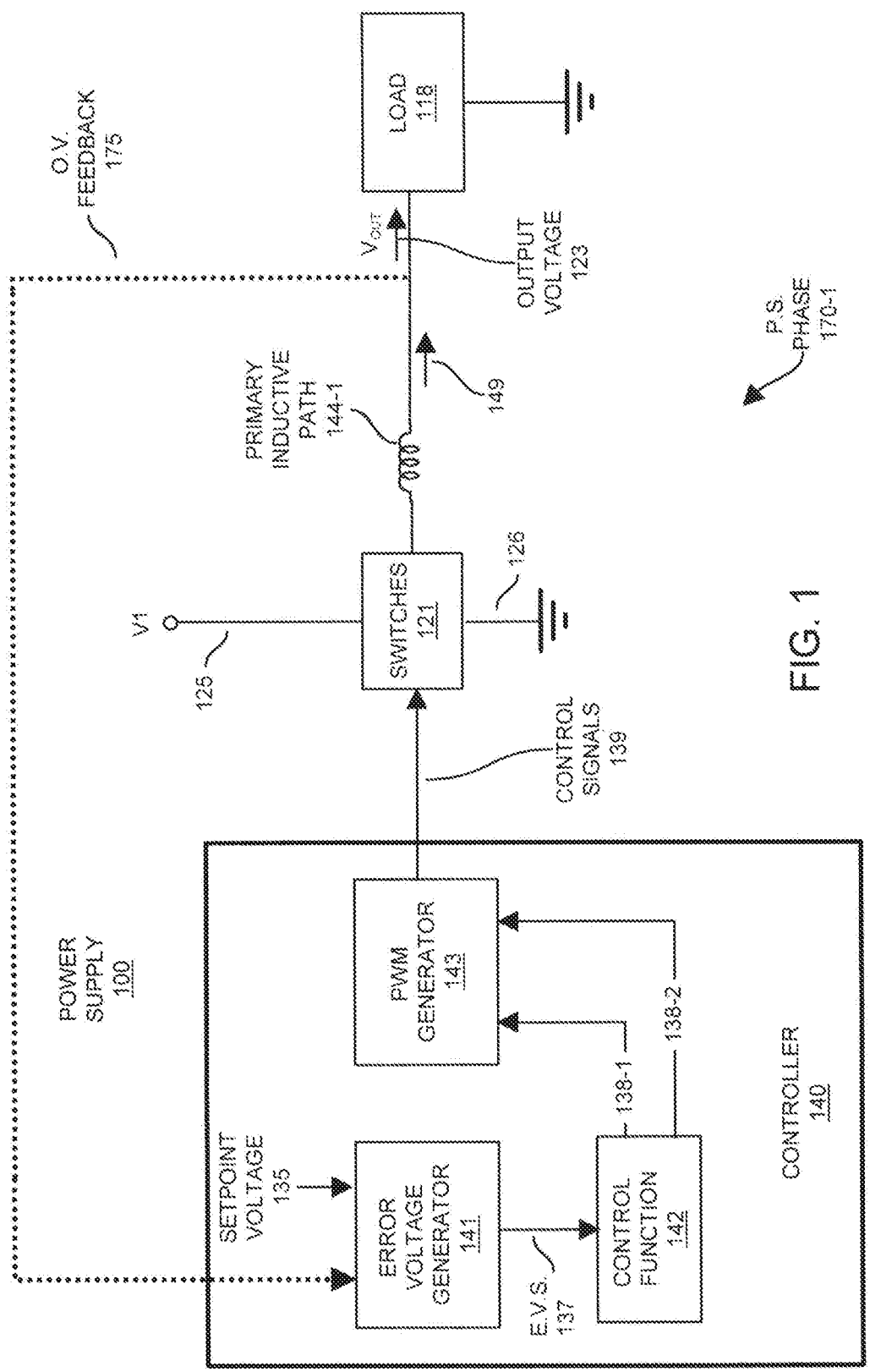
FIG. 1 is an example general diagram of a power supply and corresponding components according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

For high power ICs (Integrated Circuits) such as microprocessors, a high phase count multiphase buck voltage regulator is required to meet the high current requirements.

Multiphase buck converters are an efficient way to operate parallel power stages, and support interleaving of the phase PWM pulses, and current balancing to ensure that the current is distributed somewhat evenly among all the available power stages.

Linear control schemes, such as voltage mode control or current mode control have different tradeoffs in terms of ease of use, sensor requirements, and ability to response to fast transients, particularly fast changes in output current.

Linear control schemes are typically augmented by non-linear control schemes which either modify the pulse width, insert a pulse, or vary the PWM frequency, and this non-linear control either replaces the linear control or tries to add to the linear control impact on the output voltage during transient conditions.

This type of multi modal, linear plus nonlinear control, is highly dependent on the operating conditions, the specific Vin, Vout, inductors, capacitors, and load current steps, and must be tuned to properly optimize the transient behavior.

A scheme that allows the controller to modulate the duty cycle while incorporating the benefits of simultaneously controlling the pulse width and frequency of the PWM pulses as described herein offers significant advantages over control schemes where the ability to jointly, simultaneously, or concurrently, control both parameters is limited. In one embodiment, "concurrent control" means generally at the same time, such as apply pulse or frequency adjustments one after the other or at the same time.

If issues such as large output voltage overshoot and undershoot, current imbalance, loss of interleaving, and multimodal, chaotic response are properly addressed by the control scheme, then additional margining required to ensure the output voltage stays within the targeted regulation window can be minimized.

Step-Down DC-DC converters predominantly incorporate Buck Converter topology to efficiently convert a higher DC voltage that facilitates distribution, to lower DC voltages at high current required by high performance digital ICs such as CPU, GPU, ASIC.

For very high load currents, multiphase buck converters are primarily used to allow parallel usage of power stages and inductors, that distribute the power loss evenly across parallel devices to maximize the power output and efficiency.

Control schemes for these buck converters use predominantly 2 types of modulated power stage control pulse width modulation: fixed frequency with variable duty cycle or constant-on-time with variable frequency. In either of these cases, the effective duty cycle drives the power stage to support a certain output voltage.

Some schemes modify both duty cycle and frequency, but is generally done in a scheme which either switches between modes, or uses a nonlinear scheme where one of the changes is not modulated by the error voltage.

In contrast to conventional techniques, embodiments herein include a method of PWM control, where the effective duty cycle is obtained by modulating both the pulse width Ton, and the pulse frequency Fsw, giving an effective duty cycle of Deff=Ton*Fsw, hence embodiments herein include a "multidimensional" PWM controller, where Ton and Fsw are modified concurrently as the objective of the control scheme.

In one embodiment, the controller as described herein generalizes to control schemes where the feedback and voltage error are processed to generate control parameters for adjusting the Ton and Fsw so as to generate the effective duty cycle in a manner that offers superior response than schemes that either modulate just one of these parameters, such as fixed frequency PWM, and variable frequency Constant On Time, as well as schemes that independently adjust Ton and Fsw.

Certain embodiments herein include linear, non-linear and band splitting for multidimensional PWM control, and application to multiphase buck converters.

As previously discussed, one embodiment herein includes controlling the relationship between adjusting Ton and Fsw simultaneously as a response to the control system regulating the output voltage. This can be done by the relationship between duty cycle (the basis for PWM modulation) and the pulse width Ton and switching frequency Fsw. The effective Duty cycle modulation is a function of the Ton modulation and the Fsw modulation, and traditional analysis methods for linear and non-linear closed loop systems can be employed.

Now, more specifically, FIG. 1 is an example general diagram of a power supply according to embodiments herein.

As shown, power supply phase 170-1 of power supply 100 includes controller 140, switches 121, and inductor 144. The power supply 100 produces corresponding output voltage 123 which powers the load 118.

As further shown, the controller 140 includes error voltage generator 141, control function 142, and PWM generator 143.

In accordance with more specific embodiments, as its name suggests, the error voltage generator 141 compares the output voltage feedback 175 (such as the output voltage 123 or other voltage signal derived from the output voltage 123) to the setpoint voltage 135. The setpoint voltage 135 controls a regulation magnitude of the output voltage 123.

Based on the difference between the output voltage feedback 175 and the setpoint voltage 135, the error voltage generator 141 produces the error voltage signal 137. The error voltage signal 137 indicates a degree to which the output voltage 123 is in or out of regulation. For example, the magnitude of the error voltage signal 137 increases during conditions in which the output voltage 123 increases or decreases with respect to the setpoint voltage 135.

In accordance with further embodiments, the control function 142 of the controller 140 monitors the error voltage signal 107 indicating a difference between the output voltage 123 and the setpoint voltage 135 (a.k.a., reference voltage). Based on attributes of the monitored error voltage signal 137, the controller 140 generates modulation control signals 138.

In one embodiment, the modulation control signals include adjustment signals such as a frequency adjustment signal 138-1 (one or more values over time) and an ON-time adjustment signal 138-2 (such as one or more values over time).

As further discussed herein, via the modulation control signals 138, the controller 140 simultaneously controls modulation of a pulse width modulation signal of the power supply 100 (such as a first power supply phase) in accordance with the both frequency modulation adjustment signal 138-1 and the ON-time modulation adjustment signal 138-2.

Note that the control function 142 can be configured to generate the frequency modulation adjustment signal 138-1 and the on-time modulation adjustment signal 138-2 based on any of one or more monitored parameters. For example, in one embodiment, the control function 142 generates the modulation adjustment signals 138 based on monitoring a magnitude of the error voltage signal 137. Additionally, or alternatively, the control function 142 of the controller 140 generates the modulation adjustment signals 138 based on monitoring and attributes of a frequency of the error voltage signal 137.

As previously discussed, and as further shown, the PWM generator 143 generates respective switch control signals 139 based at least in part upon the modulation adjustment signals 138. For example, as previously discussed, based on the frequency modulation adjustment signal 138-1 and the on-time modulation adjustment signal 138-2, the PWM generator 143 generates the respective control signals 139 to control switches 121. The combination of the frequency modulation adjustment signal 138-1 and the on-time modulation adjustment signal 138-2 indicates an amount by which to modify a duty cycle of controlling respective switches 121.

In one embodiment, in accordance with the control signals 139, the switches 121 switch between coupling the inductor 144-1 to the input voltage 125 and the ground reference voltage 126 to produce the respective output voltage 123 that powers (such as via current 149 through the inductor 144-1 to) the load 118.

Figure 2:
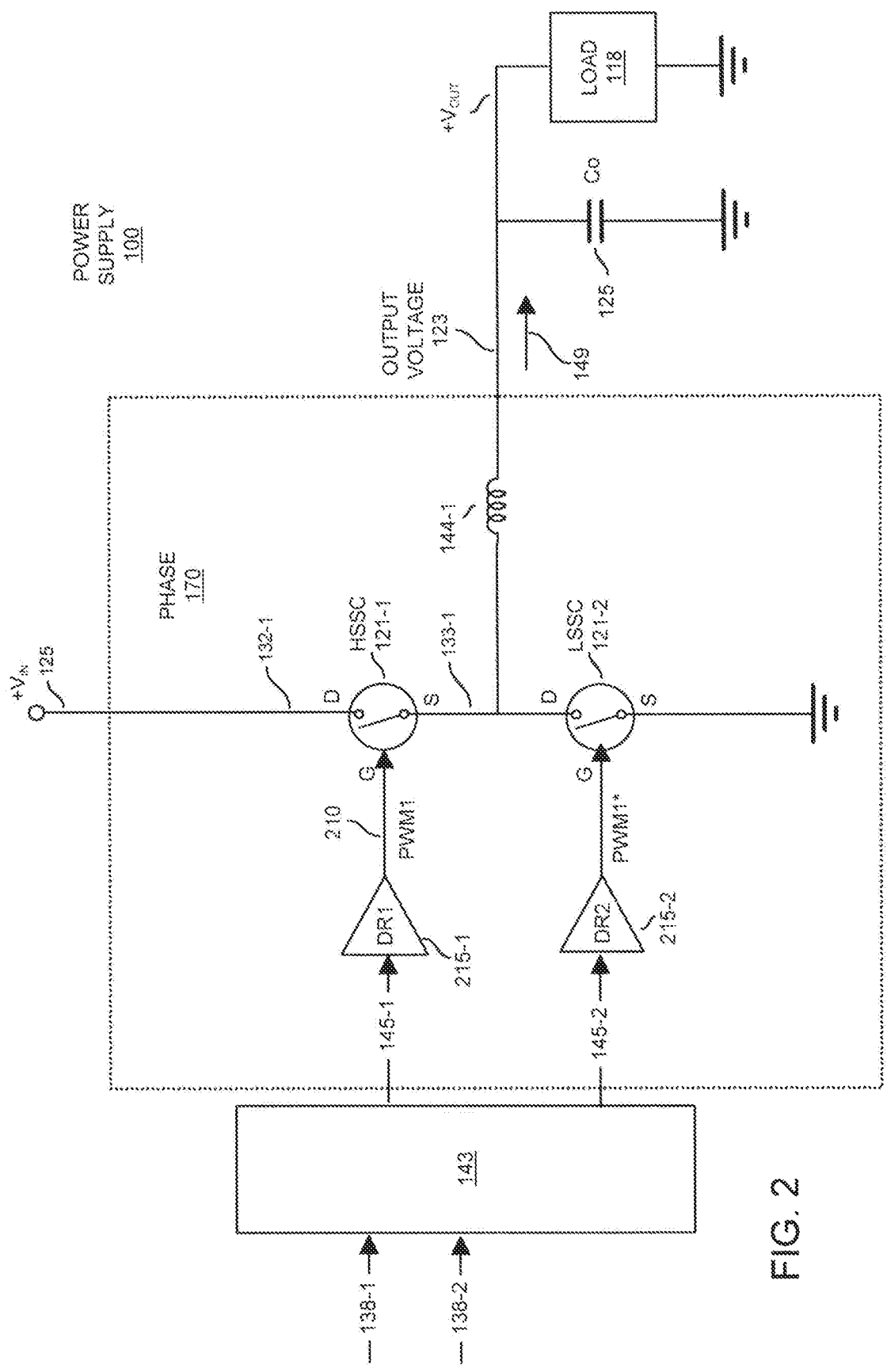
FIG. 2 is an example detailed diagram of a power supply phase according to embodiments herein.

FIG. 2 is an example more detailed diagram of a power supply phase according to embodiments herein.

The following FIG. 2 illustrates an example of phase circuitry 170-1 to produce the output voltage 123 based on modulation adjustment signals 138-1 and 138-2 in a so-called buck configuration for a given phase of the power supply 100.

As shown in FIG. 2, the phase circuitry 170-1 includes driver circuitry 215-1, driver circuitry 215-2, high side switch circuitry 121-1 (such as a control switch or switches), low side switch circuitry 121-2 (such as a synchronous switch or switches), pulse width modulation generator 143, and inductor 144-1.

The modulation adjustment signals 138 serve as a basis to produce control signal 145-1 and control signal 145-2 to control respective high side switch circuitry 121-1 and low side switch circuitry 121-2.

Note that switch circuitry 121-1, 121-2 can be any suitable type of switch resource (field effect transistors, bipolar junction transistors, etc.). In one embodiment, each of the high side switch circuitry 121-1 and low side switch circuitry 121-2 are or include one or more power MOSFET (Metal Oxide Semiconductor Field Effect Transistor) or other suitable switch devices.

Appropriate switching of the high side switch circuitry 121-1 and the low side switch circuitry 121-2 results in generation of the output voltage 123 as is known in a conventional DC-DC converter such as a buck converter.

Typically, the PWM generator 143 receives the modulation adjustment signals 138 from control function 142 (as previously discussed in FIG. 1), and on this basis, controls the driver circuitry 215-1 to produce a PWM control signal 210 (PWM1) to control high side switch circuitry 121-1 and a PWM control signal (PWM1* which is an inversion of PWM1) to control low-side switch circuitry 121-2. In general, the low side switch circuitry 121-2 is activated (shorted or ON) when the high side switch circuitry 121-1 is deactivated (open or OFF). Conversely, the low side switch circuitry 121-2 is deactivated (open or off) when the high side switch circuitry 121-1 is activated (shorted or ON.

As previously discussed, depending upon operating conditions such as attributes of the monitored output voltage 123, the control function 142 in FIG. 1 produces the respective modulation adjustment signals 138. As further discussed herein, in accordance with the modulation adjustment signals 138 indicating frequency and on-time adjustments, the PWM generator 143 controls the respective high side switch circuitry 121-1 and the low side switch circuitry 121-2 to produce the output voltage.

Figure 3:
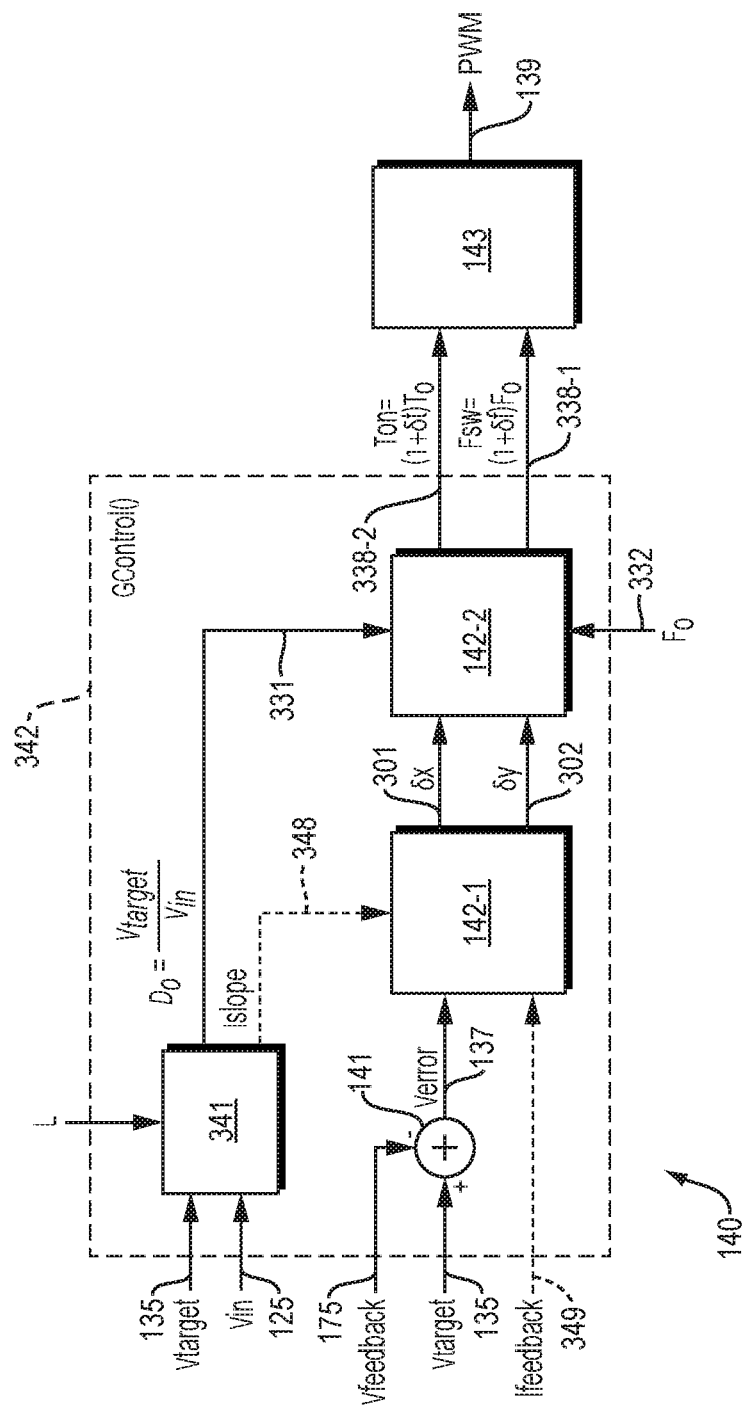
FIG. 3 is an example diagram illustrating components associated with a phase controller according to embodiments herein.

FIG. 3 is an example diagram illustrating components associated with a phase controller according to embodiments herein.

In this example embodiment, the controller 140 includes control function 342. As shown, the control function 342 includes feedforward function 341, error voltage generator 141, control function 142-1 (such as one or more PID control functions), control function 142-2, and PWM generator 143.

In accordance with further example embodiments, the feedforward function 341: i) generates a nominal frequency value F0 (e.g., signal) to which a frequency adjustment signal Sf (signal 138-1) is applied to produce a frequency setting Fsw at which to generate the pulse width modulation switch control signals 139; and ii) generates a nominal ON time value (e.g., signal) To to which the ON-time adjustment signal St (signal 130-2) is applied to produce an ON-time setting Ton of the pulse width modulation switch control signals 139.

In one embodiment, control function 142-1 such as Gxy( ) of controller 140 is a generalized filter that supports either or both voltage mode/current mode and MAP/NAP and split filter paths; the outputs of which are multiple generalized modulation control indices δx (signal 301) and δy (signal 302) generated based on the error voltage signal 137.

If desired, note that the function 142-1 and/or function 142-2 can be configured to generate dt (a.k.a., δt) and df (a.k.a., δf) directly from monitoring the error voltage signal 137.

In one embodiment, the function 142-1 and/or function 142-2 implements a MAP/NAP function (linear or non-linear mapping control function) as further discussed herein.

As further shown, the control function 342 such as Gcontrol( ) is a generalized version of the overall control structure receiving output voltage feedback signal 175 (such as the output voltage 123) and optionally Ifeedback (current feedback 345 indicating a magnitude of current 149), and other system information (Vin such as input voltage 125, Vtarget such as setpoint voltage 135, inductance L of the corresponding inductor 144-1, nominal frequency setting F0). Based on the modulation control indices dx such as signal 301 (a.k.a., δx) and dy such as signal 302 (a.k.a., δy), the control function 342 produces appropriate control signals 338-1 (Ton) and 338-2 (Fsw) to control the output voltage 123 within a desired voltage range.

Note that use of the current feedback 349 in the current slope signal 348 are used when the power supply 100 is operated in a current mode control instead of a voltage mode control. In a respective voltage mode control, the current slope signal 348 in the current feedback signal 349 are not used to control operation of the power supply phase 170-1.

In furtherance of generating a respective output voltage 123 at a desired magnitude, the control function 142-1 produces a respective on-time modulation index value 301 (δx) based on monitoring of the error voltage signal 137 and/or current feedback signal 349. The control function 142-1 also produces a respective frequency modulation index value 302 (δy) based on monitoring of the error voltage signal 137 and/or current feedback signal 349.

As further shown, the function 142-2 such as Modindex receives the modulation index value 301 (such as δx) and the modulation index value 302 (such as δy). In one embodiment, the control function 142-2 (such as linear or nonlinear mapping function) maps or converts the on-time modulation index value 301 to the value St. The control function 142-2 (such as linear or nonlinear mapping function) also maps or converts the frequency modulation index value 302 to the value Of.

The function 142-2 then generates the appropriate Ton and Fsw control words such as frequency modulation control signal 338-1, i.e., Ton=(1+δt) T0, and on-time modulation control signal 338-2, i.e., Fsw=(1+δf) F0. These generated control words are used as a basis to produce the respective switch control signals 139. That is, the frequency modulation control signal 338-1 indicates a respective frequency Fsw at which to operate the corresponding switch control signals 139; the on-time control signal 338-2 indicates a respective duration in which to activate the high side switch circuitry 121-1 in a respective control cycle (period=1/Fsw) for a period of the chosen frequency Fsw.

Thus, via joint (such as simultaneous or concurrent) modulation of both control words Ton and Fsw (control signals 338-1 and 338-2), the controller 140 achieves an effective duty cycle of the switch control signals 139 to be D=Ton*Fsw. As the error voltage signal 137 changes over time, the control function 142-1 produces different values for signal 301 and signal 302 to modulate settings of signal 338-1 and signal 338-2.

Thus, in one embodiment, the function 142-1 is or includes a PID controller that generates one or more indices modulation coefficients δx and δy such as control signals with 301 and 302, and when combined with Feedforward duty cycle value D0 (where D0 equals a magnitude of the setpoint voltage 135 divided by a magnitude of the input voltage 125), modulates control signals 338 (such as Ton and Fsw) to achieve an effective and desired duty cycle D associated with the switch control signals 139.

The magnitude of the output voltage 123 varies over time such as due to transient load 118 current consumption conditions. The PWM generator 143 generates respective switch control signals 139 based upon the modulation adjustment signals St and Of, which vary over time depending on the error voltage signal 137. For example, as previously discussed, the control function 142-2: i) generates an ON-time control signal 338-2 from the ON-time adjustment signal St and the nominal on-time value T0, ii) generates a switching frequency control signal from the frequency adjustment signal δf and the nominal switching frequency value F0, and iii) modulates the pulse width modulation switch control signals 139 based on updated values (modulated values) of the ON-time modulation control signal 338-2 and the switching frequency modulation control signal 338-1.

Accordingly, embodiments herein include, via the controller 140 and corresponding control circuitry, simultaneously: i) adjusting a frequency Fsw of the pulse width modulation signals (switch control signals 139) based on the frequency adjustment signal (such as δf), and ii) adjusting an ON-time Ton of the pulse width modulation signals (switch control signals 139) based on the ON-time adjustment signal (such as 80.

Figure 4:
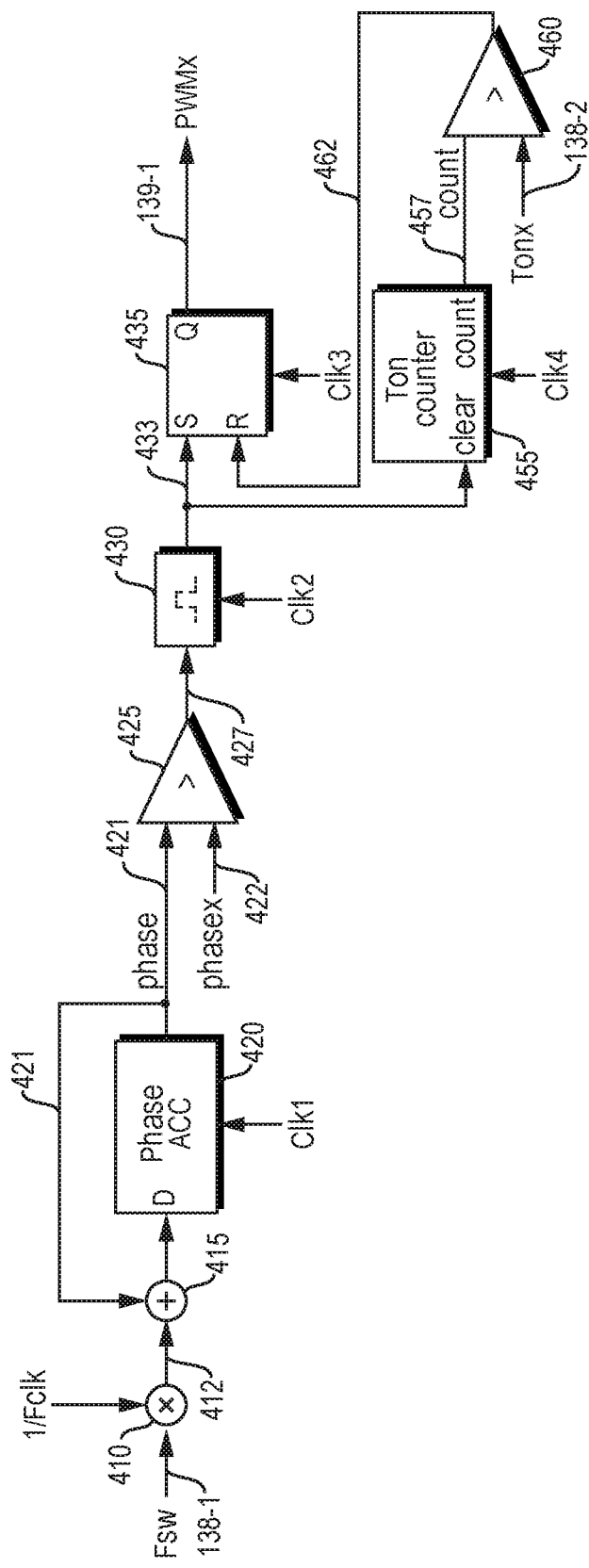
FIG. 4 is an example diagram illustrating a pulse width modulator according to embodiments herein.

FIG. 4 is an example diagram illustrating a pulse width modulation according to embodiments herein.

As shown in FIG. 4, in one nonlimiting example embodiment, the PWM generator 143 can be configured to include multiplier 410, summer 415, phase accumulator counter 420, comparator 425, one-shot signal generator 430, SR flip-flop 435, counter 455, and comparator 460.

The PWM generator 143 in this example embodiment is counter based. For example, the input parameter Fsw control frequency is equal to 1/period of the pwm. The phase accumulator 420 is a counter operating off clk1 (such as 200 MHz) such as a high frequency clock (much greater than the switching frequency Fsw such as 2 MHz), which increments depending on the value Fsw/Fclk (signal 412 produced the amount of applying Fsw by the value 1/Fclk via the multiplier 410). The phase accumulator 420 rolls over at a period of Fsw/Fclk clock cycles. In general, the phase accumulator 420 keeps track of an average period of the switching frequency setting Fsw (which is modulated over time) and the current phase within a period.

In one embodiment, as previously discussed, the value Fsw is modulated (changed based on monitoring the error voltage signal 137) during a respective clock period of generating the PWM switch control signals so the corresponding phase 170-1 is essentially a running integral of the Fsw input, implementing dθ/dt=Fsw, where θ is the phase as stored in the phase accumulator 420.

Phasex signal 422 is a control input that sets/controls timing of beginning of the PWM switch control signal 139. For example, when the accumulated value (signal 421) associated with the accumulator 420 exceeds the threshold value signal 422 such as phasex signal 422, the output 427 (such as trigger edge) of the comparator 425 causes the one shot signal generator 430 to produce output 433 that sets the SR flip-flop 435 (sets Q=logic high) and clears the on-time counter 455 (controlling the on-time duration Ton).

As further shown, when the comparator 460 detects that the count value 457 produced by the on-time counter 455 equals or exceeds a respective threshold value Ton (indicating an appropriate amount of time as specified by Ton), the comparator 460 produces the respective control signal 462 to reset the SR flip-flop 435 causing the pulse with modulation control signal 139-1 to go low and turn off high side switch circuitry 121-1 (at or around the same time, signal 139-2 switched to logic high turning on low side switch circuitry 121-2).

Thus, the phase accumulator 420 controls a duration of the period of the pulse with modulation control signals 139 depending on a respective average of the control word Fsw for each control cycle; the Ton counter 455 controls the on-time duration of the respective switch control signals 139 for each control cycle.

Note that operation of the PWM generator 143 repeats every control cycle such that input Fsw sets the switching period and frequency of the switch control signals 139, and the value Tonx (signal 138-2) sets/controls the pulse width and the effective duty cycle of the pulse with modulation control signal 139-1 to be Tonx*Fsw.

Thus, the PWM generator 143 of the controller 144 includes or implements phase accumulator 420 (such as an accumulator function) that monitors passage of a period of the switching frequency signal. In one embodiment, based on the one-shot signal generator 430 and the comparator 425, the controller 140 is operable to restart the pulse width modulation control signals 139 in response to a result produced by comparing an output 421 of the phase accumulator 420 to a respective threshold value 422 (threshold value signal).

Figure 5:
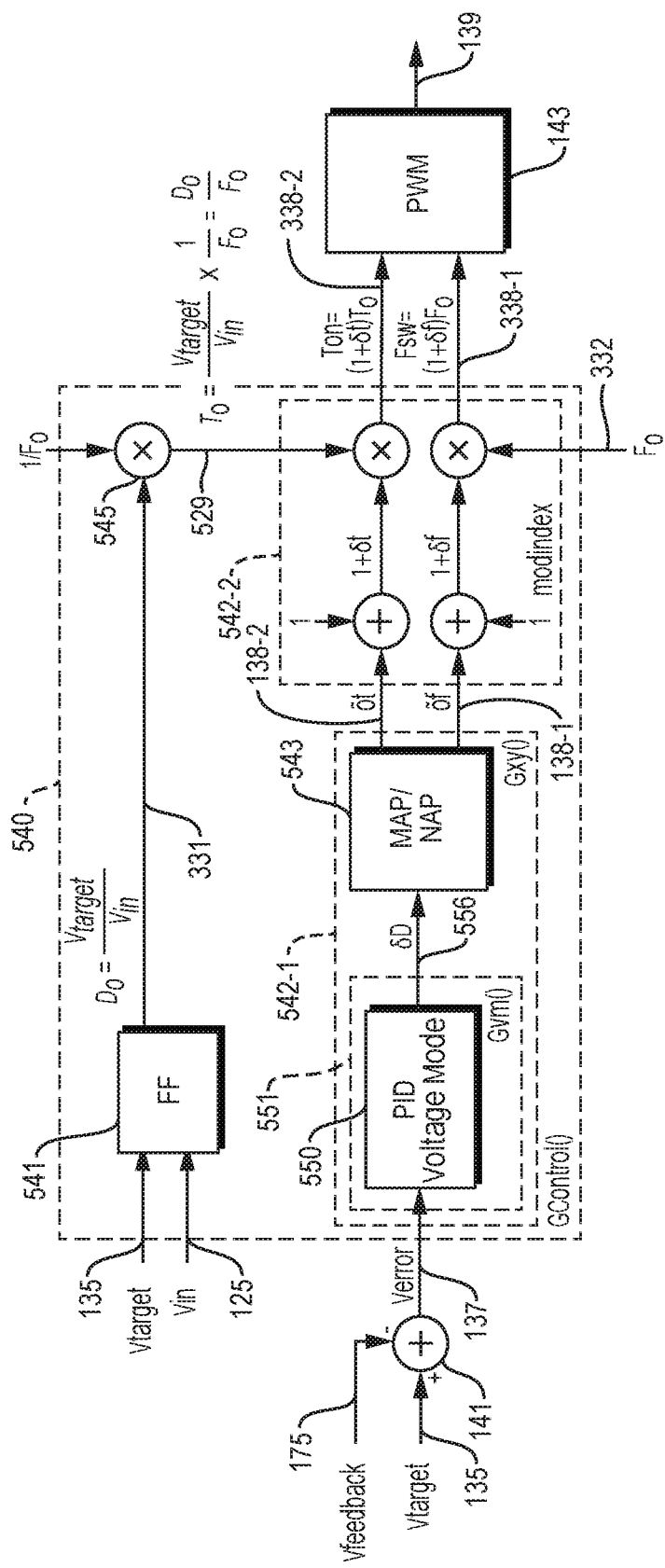
FIG. 5 is an example diagram illustrating components associated with a phase controller according to embodiments herein.

FIG. 5 is an example diagram illustrating components associated with a phase controller according to embodiments herein.

In this example embodiment, the controller 140 includes control function 540. As shown, the control function 540 includes feedforward function 541, error voltage generator 141, control function 542-1 (such as including PID controller 550 and mapping function 543), modulation index function 542-2, and PWM generator 143.

In one embodiment, the control function 551 such as Gvm( ) is a traditional voltage mode control filter such as a PID 550, with the output 556 of the PID controller 550 interpreted as a duty cycle modulation index value dD (a.k.a., $\delta D$). Note that other representations are possible, but generally there is a linear relationship between the effective Duty Cycle and output of the PID 550 while operating in a voltage control mode (as opposed to a current control mode).

In this example embodiment, the mapping function 453 such as MAP/NAP produces St (signal 138-2) and Sf (signal 138-1) as functions of SD as received from the output 556 of the PID controller 550.

In one embodiment, a linear MAP (such as mapping function 543) captures a relationship $(1+\delta D)=(1+\delta t)(1+\delta f)$.

In accordance with another embodiment, a non-linear MAP (such as mapping function 543) has an effective duty cycle given by:
$D_{eff}=1+dD'=(1+\delta t)(1+\delta f)$, where Deff is the effective duty cycle of the PWM control signals 139.

One can view a traditional fixed frequency voltage mode control of implementing the controller 140 as setting $\delta f=0$ and $\delta t=\delta D$.

One can view $\delta t=0$ and $\delta f=\delta D$ as a Constant ON-Time controller, although generally these use ramp/comparator based structures instead of PWM generators.

In one embodiment, the controller 140 operates in a voltage mode control. In such an instance, the PID controller 550 receives the error voltage signal 137 in a manner as previously discussed. Based upon the error voltage signal 137, the controller produces the respective duty cycle adjustment value $\delta D$.

The nominal Duty cycle Do (signal 331) is computed from feedforward Vtarget/Vin.

Linearized Mapping MAP such as implemented via mapping function 543 converts received duty cycle adjustment value SD (signal 556) into pulse width adjustment St (such as signal 138-2) and switching frequency adjustment Sf (such as signal 138-1).

In one embodiment, mapping conversion via the mapping function 543 is constrained by $(1+\delta D)=(1+\delta t)(1+\delta f)$ in order to be linearized.

The effective duty cycle Deff is obtained by combining the nominal pulse width T0 (signal 529) and the nominal switching frequency F0 (signal 332) with the pulse width adjustment St and switching frequency adjustment Sf in the following manner:

$$D_{eff}=(T_0(1+\delta t)(F_0(1+\delta f))=(T_0F_0(1+\delta t)(1+Sf))=D_0(1+\delta D)$$

Note that there are many ways to implement a linearized mapping and 2 dimensional modulation of the PWM waveform which is equivalent to the more traditional 1 dimensional modulation (e.g. Ton modulation or COT frequency modulation), which are inherently linear.

In accordance with further example embodiments, the mapping function 543 can be nonlinear. In such an instance, mapping function 543 is implemented as nonlinear mapping (so-called NAP).

As previously discussed, the PID controller 550 generates a duty cycle adjustment $\delta D$. The mapping function 543 (NAP) converts duty cycle adjustment $\delta D$ into pulse width adjustment St and switching frequency adjustment $\delta f$.

Functions $fx(\delta D)$ and $fy(\delta D)$ can be any form, but would generally be a simple monotonic function, such as piecewise linear. In such an instance, effective duty cycle is then:

$$D_{eff} = (T_0(1+\delta t))(F_0(1+\delta f)) = (T_0F_0(1+\delta t)(1+\delta f)) = D_0(1+\delta t+\delta f+\delta t\delta f) = D_0(1+\delta D')$$

Equivalent to a system that generates the duty cycle adjustment $\delta D'=(\delta t+\delta t\delta f)$, where $\delta D'=fz(\delta D)$ and fz( ) is a nonlinear function of $\delta D$.

In accordance with further example embodiments, the mapping function 543 as described herein can be implemented via a respective table below (such as table 1, table 2, table 3, or table 4).

TABLE 1

First Example Mapping Function
Fixed Frequency for 0.5 <= (D/D0) <= 2

| 1 + $\delta D$ Duty/D0 | 1 + $\delta t$ Ton/T0 | 1 + $\delta f$ Fsw/F0 | 1 + $\delta D'$ Ton*Fsw |
|---|---|---|---|
| 0 | 0.5 | 0 | 0 |
| 0.1 | 0.5 | 0.2 | 0.1 |
| 0.2 | 0.5 | 0.4 | 0.2 |
| 0.3 | 0.5 | 0.6 | 0.3 |
| 0.4 | 0.5 | 0.8 | 0.4 |
| 0.5 | 0.5 | 1 | 0.5 |
| 0.6 | 0.6 | 1 | 0.6 |
| 0.7 | 0.7 | 1 | 0.7 |
| 0.8 | 0.8 | 1 | 0.8 |
| 0.9 | 0.9 | 1 | 0.9 |
| 1 | 1 | 1 | 1 |
| 1.1 | 1.1 | 1 | 1.1 |
| 1.2 | 1.2 | 1 | 1.2 |
| 1.3 | 1.3 | 1 | 1.3 |
| 1.4 | 1.4 | 1 | 1.4 |
| 1.5 | 1.5 | 1 | 1.5 |
| 1.6 | 1.6 | 1 | 1.6 |
| 1.7 | 1.7 | 1 | 1.7 |
| 1.8 | 1.8 | 1 | 1.8 |
| 1.9 | 1.9 | 1 | 1.9 |
| 2 | 2 | 1 | 2 |
| 2.2 | 2 | 1.1 | 2.2 |
| 2.4 | 2 | 1.2 | 2.4 |

TABLE 1-continued

First Example Mapping Function
Fixed Frequency for 0.5 <= (D/D0) <= 2

| 1 + δD
Duty/D0 | 1 + δt
Ton/T0 | 1 + δf
Fsw/F0 | 1 + δD'
Ton*Fsw |
|---|---|---|---|
| 2.6 | 2 | 1.3 | 2.6 |
| 2.8 | 2 | 1.4 | 2.8 |
| 3 | 2 | 1.5 | 3 |
| 3.2 | 2 | 1.6 | 3.2 |
| 3.4 | 2 | 1.7 | 3.4 |
| 3.6 | 2 | 1.8 | 3.6 |
| 3.8 | 2 | 1.9 | 3.8 |
| 4 | 2 | 2 | 4 |

As shown in table 1 above, the first implementation of map function 543 is constant frequency except for narrow pulses (needed for low output voltage with minimum pulse width restriction) and wide pulses (improve transient response).

As an example, assume that a magnitude of the output voltage 123 or output voltage feedback signal 175 is equal to the setpoint voltage 135. In such an instance, the error voltage is equal to 0 corresponding to sequence (1, 1, 1, 1) in table 1. For example, signal 138-1 and signal 138-2 are both equal to 0. In such an instance, the PWM generator 143 produces the respective switch control signals 139 based on Ton=To and Fsw=F0.

Assume that a magnitude of the output voltage 123 or output voltage feedback signal 175 is greater than the setpoint voltage 135. In such an instance, the error voltage is a negative value. Based on the magnitude of the error voltage signal 137, assume that the PID controller 550 produces the output signal 556 (δD) to be negative 0.5. In such an instance, mapping corresponds to sequence (0.5, 0.5, 1, 0.5) in table 1. For example, the map function 543 generates the signal 138-1 (St) equals −0.5 and signal 138-2 (δf) equals 0. In such an instance, the PWM generator 143 produces the respective switch control signals 139 based on Ton=(0.5)*To and Fsw=F0.

Assume that a magnitude of the output voltage 123 or output voltage feedback signal 175 is less than the setpoint voltage 135. In such an instance, the error voltage is a positive value. Based on the magnitude of the error voltage signal 137, assume that the PID controller 550 produces the output signal 556 (δD) to be positive 1.5. In such an instance, mapping corresponds to sequence (1.5, 1.5, 1, 1.5) in table 1. For example, signal 138-1 (St) equals 0.5 and signal 138-2 (δf) equals 0. In such an instance, the PWM generator 143 produces the respective switch control signals 139 based on Ton=(1.5)*To and Fsw=F0.

In this manner, via generation of different δD values by the PID controller 550 over time, the mapping function updates values of St (ON-time adjustment values) and δf (frequency adjustment values) to modulate one or more of the corresponding switching frequency Fsw and ON-time Ton used by the pulse width modulation generator 143 to generate the control signals 139 as described herein.

Table 2 below illustrates constant on time except for low Fsw (need narrow pulses to generate low output voltage) and high Fsw (need wider pulses to improve transient response).

TABLE 2

Second Example Mapping Function
Fixed Ton for 0.5 <= (D/D0) <= 2

| 1 + δD
Duty/D0 | 1 + δt
Ton/T0 | 1 + δf
Fsw/F0 | 1 + δD'
Ton*Fsw |
|---|---|---|---|
| 0 | 0 | 0.5 | 0 |
| 0.1 | 0.2 | 0.5 | 0.1 |
| 0.2 | 0.4 | 0.5 | 0.2 |
| 0.3 | 0.6 | 0.5 | 0.3 |
| 0.4 | 0.8 | 0.5 | 0.4 |
| 0.5 | 1 | 0.5 | 0.5 |
| 0.6 | 1 | 0.6 | 0.6 |
| 0.7 | 1 | 0.7 | 0.7 |
| 0.8 | 1 | 0.8 | 0.8 |
| 0.9 | 1 | 0.9 | 0.9 |
| 1 | 1 | 1 | 1 |
| 1.1 | 1 | 1.1 | 1.1 |
| 1.2 | 1 | 1.2 | 1.2 |
| 1.3 | 1 | 1.3 | 1.3 |
| 1.4 | 1 | 1.4 | 1.4 |
| 1.5 | 1 | 1.5 | 1.5 |
| 1.6 | 1 | 1.6 | 1.6 |
| 1.7 | 1 | 1.7 | 1.7 |
| 1.8 | 1 | 1.8 | 1.8 |
| 1.9 | 1 | 1.9 | 1.9 |
| 2 | 1 | 2 | 2 |
| 2.2 | 1.1 | 2 | 2.2 |
| 2.4 | 1.2 | 2 | 2.4 |
| 2.6 | 1.3 | 2 | 2.6 |
| 2.8 | 1.4 | 2 | 2.8 |
| 3 | 1.5 | 2 | 3 |
| 3.2 | 1.6 | 2 | 3.2 |
| 3.4 | 1.7 | 2 | 3.4 |
| 3.6 | 1.8 | 2 | 3.6 |
| 3.8 | 1.9 | 2 | 3.8 |
| 4 | 2 | 2 | 4 |

As shown in table 2 above, the second implementation of map function 543 of constant on time except for low Fsw (need narrow pulses to generate low output voltage) and high Fsw (need wider pulses to improve transient).

As an example, assume that a magnitude of the output voltage 123 or output voltage feedback signal 175 is equal to the setpoint voltage 135. In such an instance, the error voltage is equal to 0 corresponding to sequence (1, 1, 1, 1) in table 1. For example, signal 138-1 and signal 138-2 are both equal to 0. In such an instance, the PWM generator 143 produces the respective switch control signals 139 based on Ton=To and Fsw=F0.

Assume that a magnitude of the output voltage 123 or output voltage feedback signal 175 is greater than the setpoint voltage 135. In such an instance, the error voltage is a negative value. Based on the magnitude of the error voltage signal 137, assume that the PID controller 550 produces the output signal 556 (δD) to be negative 0.5. In such an instance, mapping corresponds to sequence (0.5, 1.0, 0.5, 0.5) in table 2. For example, signal 138-1 (St) equals 0 and signal 138-2 (δf) equals −0.5. In such an instance, the PWM generator 143 produces the respective switch control signals 139 based on Ton=To and Fsw=F0*(0.5).

Assume that a magnitude of the output voltage 123 or output voltage feedback signal 175 is less than the setpoint voltage 135. In such an instance, the error voltage is a positive value. Based on the magnitude of the error voltage signal 137, assume that the PID controller 550 produces the output signal 556 (δD) to be positive 1.5. In such an instance, mapping corresponds to sequence (1.5, 1, 1.5, 1.5) in table 2. For example, signal 138-1 (dot) equals 0 and signal 138-2 (δf) equals 0.5. In such an instance, the PWM generator 143 produces the respective switch control signals 139 based on Ton=*To and Fsw=F0*(1.5).

In this manner, via generation of different δD values by the PID controller 550 over time, the mapping function updates values of δt (ON-time adjustment values) and δf (frequency adjustment values) to modulate one or more of the corresponding switching frequency Fsw and ON-time Ton used by the pulse width modulation generator 143 to generate the control signals 139 as described herein.

Table 3 illustrates constant frequency and on-time modulation for positive magnitudes of the respective error voltage signal 137, and variable frequency and constant on-time for negative magnitudes of the error voltage signals 137. This allows transient response to be done with highest possible Fsw.

TABLE 3

Third Example Mapping Function
Fixed Ton for (D/D0) <= 1

| 1 + δD<br>Duty/D0 | 1 + δt<br>Ton/T0 | 1 + δf<br>Fsw/F0 | 1 + δD'<br>Ton*Fsw |
|---|---|---|---|
| 0   | 0   | 1   | 0   |
| 0.1 | 0.1 | 1   | 0.1 |
| 0.2 | 0.2 | 1   | 0.2 |
| 0.3 | 0.3 | 1   | 0.3 |
| 0.4 | 0.4 | 1   | 0.4 |
| 0.5 | 0.5 | 1   | 0.5 |
| 0.6 | 0.6 | 1   | 0.6 |
| 0.7 | 0.7 | 1   | 0.7 |
| 0.8 | 0.8 | 1   | 0.8 |
| 0.9 | 0.9 | 1   | 0.9 |
| 1   | 1   | 1   | 1   |
| 1.1 | 1   | 1.1 | 1.1 |
| 1.2 | 1   | 1.2 | 1.2 |
| 1.3 | 1   | 1.3 | 1.3 |
| 1.4 | 1   | 1.4 | 1.4 |
| 1.5 | 1   | 1.5 | 1.5 |
| 1.6 | 1   | 1.6 | 1.6 |
| 1.7 | 1   | 1.7 | 1.7 |
| 1.8 | 1   | 1.8 | 1.8 |
| 1.9 | 1   | 1.9 | 1.9 |
| 2   | 1   | 2   | 2   |
| 2.2 | 1   | 2.2 | 2.2 |
| 2.4 | 1   | 2.4 | 2.4 |
| 2.6 | 1   | 2.6 | 2.6 |
| 2.8 | 1   | 2.8 | 2.8 |
| 3   | 1   | 3   | 3   |
| 3.2 | 1   | 3.2 | 3.2 |
| 3.4 | 1   | 3.4 | 3.4 |
| 3.6 | 1   | 3.6 | 3.6 |
| 3.8 | 1   | 3.8 | 3.8 |
| 4   | 1   | 4   | 4   |

As shown in table 3 above, the third implementation of map function 543 includes ON-time modulation adjustment for positive magnitudes of the respective error voltage signal 137, and frequency modulation adjustments for negative magnitudes of the error voltage signals 137. This allows transient response to be done with highest possible Fsw. As an example, assume that a magnitude of the output voltage 123 or output voltage feedback signal 175 is equal to the setpoint voltage 135. In such an instance, the error voltage is equal to 0 corresponding to sequence (1, 1, 1, 1) in table 1. For example, signal 138-1 and signal 138-2 are both equal to 0. In such an instance, the PWM generator 143 produces the respective switch control signals 139 based on Ton=To and Fsw=F0.

Assume that a magnitude of the output voltage 123 or output voltage feedback signal 175 is greater than the setpoint voltage 135. In such an instance, the error voltage is a negative value and the controller 140 implements frequency modulation. For example, based on the magnitude of the error voltage signal 137, assume that the PID controller 550 produces the output signal 556 (δD) to be negative 0.5. In such an instance, mapping corresponds to sequence (0.5, 0.5, 1, 0.5) in table 3. For example, signal 138-1 (δt) equals −0.5 and signal 138-2 (δf) equals 0. In such an instance, the PWM generator 143 produces the respective switch control signals 139 based on Ton=(0.5)*To and Fsw=F0.

Assume that a magnitude of the output voltage 123 or output voltage feedback signal 175 is less than the setpoint voltage 135. In such an instance, the error voltage is a positive value and the controller 140 implements ON-time modulation. Based on the magnitude of the error voltage signal 137, assume that the PID controller 550 produces the output signal 556 (δD) to be positive 1.5. In such an instance, mapping corresponds to sequence (1.5, 1, 1.5, 1.5) in table 2. For example, signal 138-1 (δt) equals 0 and signal 138-2 (δf) equals 0.5. In such an instance, the PWM generator 143 produces the respective switch control signals 139 based on Ton=To and Fsw=F0*(1.5).

In this manner, via generation of different δD values by the PID controller 550 over time, the mapping function updates values of δt (ON-time adjustment values) and δf (frequency adjustment values) to modulate one or more of the corresponding switching frequency Fsw and ON-time Ton used by the pulse width modulation generator 143 to generate the control signals 139 as described herein.

Table 4 below illustrates variable on time and variable frequency to provide a transient response.

TABLE 4

Fourth Example Mapping Function

| 1 + δD<br>Duty/D0 | 1 + δt<br>Ton/T0 | 1 + δf<br>Fsw/F0 | 1 + δD'<br>Ton*Fsw |
|---|---|---|---|
| 0.7 | 0.75 | 0.933 | 0.7 |
| 0.8 | 0.85 | 0.941 | 0.8 |
| 0.9 | 0.95 | 0.947 | 0.9 |
| 1   | 1    | 1     | 1   |
| 1.1 | 1.05 | 1.048 | 1.1 |
| 1.2 | 1.1  | 1.091 | 1.2 |
| 1.3 | 1.15 | 1.130 | 1.3 |

As shown in table 4 above, the fourth implementation of map function 543 includes simultaneously implementing ON-time modulation adjustment and frequency modulation for non-zero magnitudes of the error voltage signal 137.

As an example, assume that a magnitude of the output voltage 123 or output voltage feedback signal 175 is equal to the setpoint voltage 135. In such an instance, the error voltage is equal to 0 corresponding to sequence (1, 1, 1, 1) in table 1. For example, signal 138-1 and signal 138-2 are both equal to 0. In such an instance, the PWM generator 143 produces the respective switch control signals 139 based on Ton=To and Fsw=F0.

Assume that a magnitude of the output voltage 123 or output voltage feedback signal 175 becomes magnitude #1 (such as greater than the setpoint voltage 135). In such an instance, the error voltage is a negative value and the controller 140 implements both on-time and frequency modulation. For example, based on the magnitude and/or frequency of the error voltage signal 137, assume that the PID controller 550 produces the output signal 556 (δD) to be negative 0.1. In such an instance, mapping corresponds to sequence (0.9, 0.95, 0.947, 0.9) in table 4. For example, signal 138-1 (δt) equals −0.05 and signal 138-2 (δf) equals −0.053). Based on these settings, the PWM generator 143 produces the respective switch control signals 139 based on Ton=(0.95)*To and Fsw=(0.947)*F0.

Assume that a magnitude of the output voltage 123 or output voltage feedback signal 175 becomes magnitude #2 (such as greater than the magnitude #1). In such an instance, the error voltage is a negative value and the controller 140 implements both on-time and frequency modulation. For example, based on the magnitude and/or frequency of the error voltage signal 137, assume that the PID controller 550 produces the output signal 556 (δD) to be negative 0.2. In such an instance, mapping corresponds to sequence (0.8, 0.85, 0.941, 0.8) in table 4. For example, signal 138-1 (δt) equals −0.15 and signal 138-2 (δf) equals −0.059). In such an instance, the PWM generator 143 produces the respective switch control signals 139 based on Ton=(0.85)*To and Fsw=(0.941)*F0.

Further assume that a magnitude of the output voltage 123 or output voltage feedback signal 175 becomes magnitude #3 (such as greater than the magnitude #2). In such an instance, the error voltage is a negative value and the controller 140 implements both on-time and frequency modulation. For example, based on the magnitude and/or frequency of the error voltage signal 137, assume that the PID controller 550 produces the output signal 556 (δD) to be negative 0.3. In such an instance, mapping corresponds to sequence (0.7, 0.75, 0.933, 0.7) in table 4. For example, signal 138-1 (δt) equals −0.25 and signal 138-2 (δf) equals −0.067). In such an instance, the PWM generator 143 produces the respective switch control signals 139 based on Ton=(0.75)*To and Fsw=(0.933)*F0.

In this manner, via generation of different δD values by the PID controller 550 over time, the mapping function updates values of δt (ON-time adjustment values or change in ON-time setting) and δf (frequency adjustment values or change in frequency setting) to modulate one or more of the corresponding switching frequency Fsw and ON-time Ton used by the pulse width modulation generator 143 to generate the control signals 139 as described herein.

Figure 6:
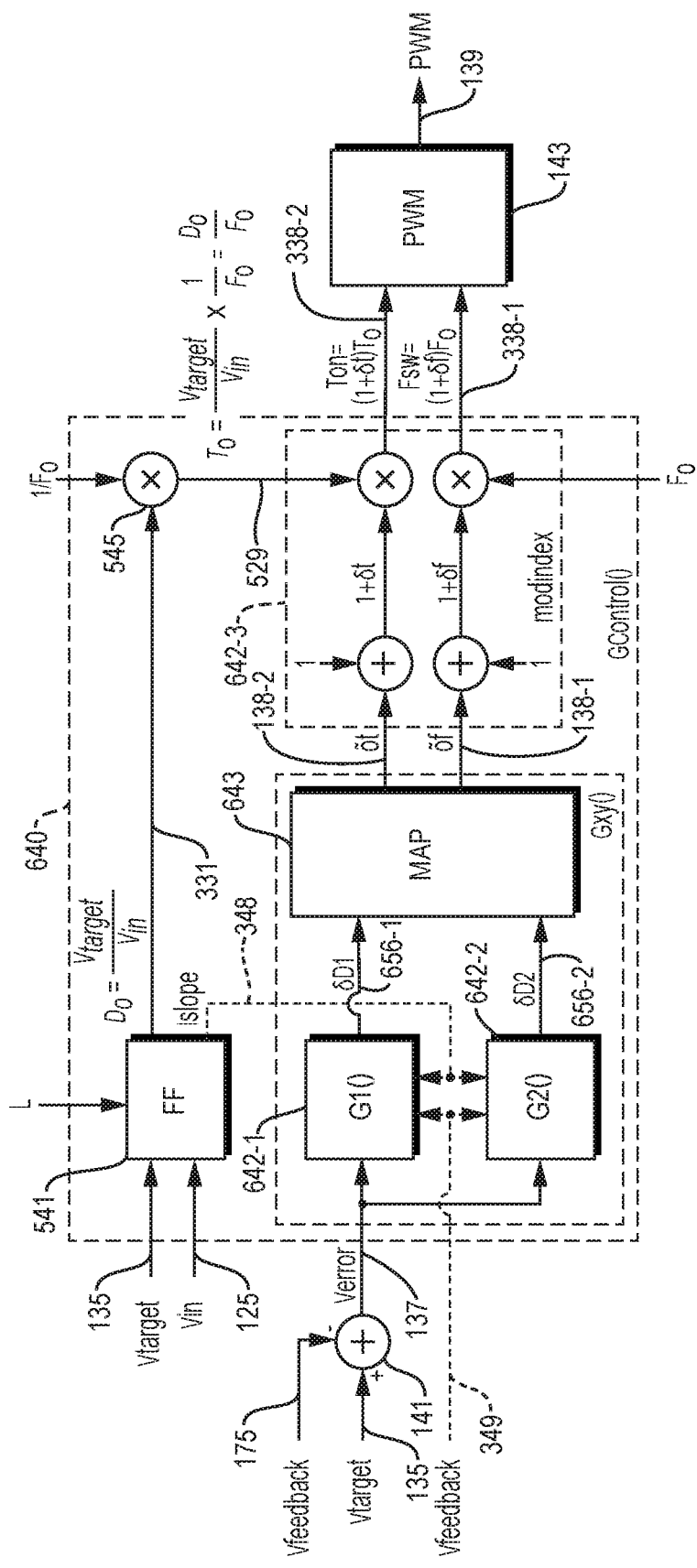
FIG. 6 is an example diagram illustrating components associated with a phase controller according to embodiments herein.

FIG. 6 is an example diagram illustrating components associated with a phase controller according to embodiments herein.

In this example embodiment, the controller 140 includes control function 640. As shown, the control function 640 includes feedforward function 541, error voltage generator 141, control function 642 (such as including control function 642-1 and control function 642-2), modulation index function 642-3, and PWM generator 143.

In one embodiment, the control function 642-1 such as G1( ) and control function 642-2 such as G2( ) are filters, such as one or more PID controllers, that receive the respective error voltage signal 137 (Verror) and generate a control parameter that causes the modulator to drive the plant in a manner to minimize Verror. For example, one can consider this to be a change in the effective duty cycle, but here the different control functions produce generic modulation indices δD1 (signal 656-1 produced by the control function 642-1 based upon the error voltage signal 137) and δD2 (signal 656-2 produced by the control function 642-2 based upon the error voltage signal 137).

Note that the control functions 642-1 and 642-2 can be configured to operate in a voltage mode or current mode. In the latter instance, the controller 140 makes use of the feedback current (signal 349 indicating a magnitude of the current 149 supplied to the load) and current slope information (signal 348) to change the control current.

Further in this example embodiment, the control function 642 such as Gxy( ) is a multidimensional control filter structure, which receives error voltage signal 137 (and feedback such as signal 349 in case of current mode), and is operable to generate respective modulation indices δt (signal 138-2) and δf (signal 138-1) which modulate Ton and Fsw in a manner as previously discussed.

Note further that the control function 642 such as Gxy( ) can either generate δt and δf directly or make use of a mapping function where δt and δf are functions of δD1 and δD2.

Additionally, embodiments herein can include either or both linear MAP and nonlinear NAP mappings via mapping function 643.

In accordance with further example embodiments, the modulation index function 642-3 such as modIndex is configured to receive the modulation indices δt and δf, and based on such values, computes the actual Ton control word (signal 138-2) and Fsw control word (signal 138-1) supplied to the PWM generator 143.

The control function 740 such as Gcontrol( ) can then be considered receiving the Verror, Ifeedback, and other system information (Vin, Vtarget, L, F0) and deriving what Ton and Fsw should be in order to obtain the desired control response to produce the output voltage 123.

Thus, in this example embodiment, the control function 642 incorporates a split path to shape the adjustment values δt and δf. For example, instead of implementing a single compensator PID, embodiments herein include implementing multiple PIDs and corresponding compensator paths.

As shown, one way to split the compensator paths is be based on frequency response. For example, in one embodiment, control function 642-1 such as G1( ) includes a high gain at DC by incorporating a PID with Integral gain, while control function 642-2 such as G2( ) is limited to just PD gain, so that the DC gain is more limited.

In accordance with further example embodiments, the control function G2( ) could include higher gain at higher frequencies.

Yet further, another way to split the paths associated with control function 642 is to provide nonlinear gain for G1( ) or G2( ), or both. For example, control function 642-1 can be implemented via a linear PID; control function 642-2 can be implemented via nonlinear function with a deadzone around Verror.

In either case, the loop dynamics would still be set by $D_{\mathit{eff}}=D_0(1+\delta D')$, where $\delta D'=(\delta t+\delta f+\delta t\delta f)$.

Assume that G1( ) is a low bandwidth such as PI, G2( ) is a higher bandwidth PID. At any given frequency, in one embodiment, both paths δD1 and δD2 associated with the control function 642 have gain, but one path will be dominant. For example, in one embodiment:

Small signal analysis of the closed loop behavior can be based on:

$$\delta D'=f(\delta t,\delta f)=(1+\delta t)(1+\delta f)-1=\delta t+\delta f+\delta t\delta f$$

For low frequency path:

$\delta D'=\delta t(1+\delta f)+\delta f \rightarrow \delta D'=\delta t$ since $\delta f<<\delta t$ High frequency path is ignored for low frequency behavior For high frequency path:

$\delta D'=\delta f(1+\delta t)+\delta t \rightarrow \delta D'=\delta f(1+\delta t(\min/\max))$ Low frequency path is treated as static for high frequency behavior Extremes of low frequency path modulation set upper and lower bounds for high frequency gain path It is possible to combine the bandsplitting approach with nonlinear functions, using a combination of compensator structures and mapping, with the desired effect to shape the adjustments δt and δf to set a desired small signal, and large signal response over frequency. Practical implementations will use some variant of this scheme, as it provides maximum flexibility to adjust the system response to the dynamic requirement Accordingly, embodiments herein include, via the controller 140, implementing a first gain transfer function 642-1 and a second gain transfer function 642-2 as well as mapping function 643. The first gain transfer function and mapping function 643 convert the monitored error voltage signal 137 into the frequency adjustment signal 138-2. The second gain transfer function in the mapping function 643 convert the monitored error voltage signal 137 into the ON-time adjustment signal 138-1.

In still further example embodiments, the first gain transfer function 642-1 and the second gain transfer function 642-2 are correlated (such as balanced with respect) to each other to generate the pulse width modulation signal 139 at different desired effective duty cycles over a range of different magnitudes, frequencies, etc., of the error voltage signal 137. For example, for settings in which the transfer function 642-1 provides little or no modulation adjustments to the on-time setting, the transfer function 642-2 provides greater modulation adjustments to the switching frequency settings. For settings in which the transfer function 642-2 provides little or no modulation adjustments to the on-time setting, the transfer function 642-1 provides greater modulation adjustments to the switching frequency settings.

Figure 7:
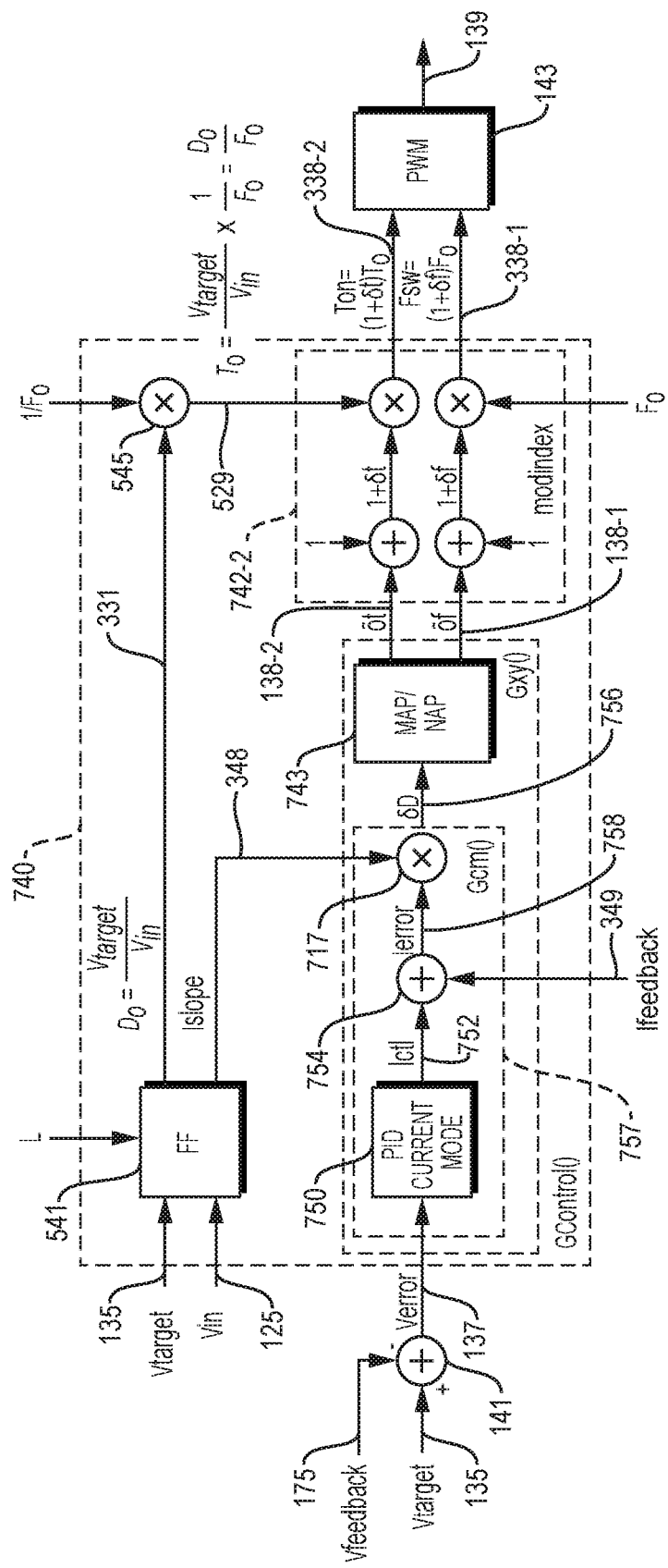
FIG. 7 is an example diagram illustrating components associated with a phase controller according to embodiments herein.

FIG. 7 is an example diagram illustrating components associated with a phase controller according to embodiments herein.

This example embodiment in FIG. 7 is similar to that shown in FIG. 5 except that the controller 140 in FIG. 7 implements the current mode control instead of the voltage mode control.

For example, the control function 757 such as Gcm( ) is a current mode control filter including PID controller 750, with the output interpreted as a control current, and then an additional current loop using Ifeedback to determine Ierror and compute the desired duty cycle to match the control current.

Note that there are other possible configurations of implementing current mode control, but most of them will generate a representation of control current and Ierror, but use other methods to generated the duty cycle.

MAP/NAP (such as mapping function 743) are then similar to usage in voltage mode control embodiments of FIG. 5. However, embodiments herein include implementing the control function 757 such as Gcm( ) which is amenable to digital implementation, but with split filters and no MAP function.

In this example embodiment of implementing current mode control, the PID 750 receives error voltage signal 137. Based on monitoring the hair voltage signal 137, the PID controller 750 produces control current signal Ictl (such as signal 752). Summer 754 produces the control signal 758 based upon a difference between signal 752 and signal 349. For example, Ictl signal 752 is compared to the feedback current Ifeedback signal 349, and the generated difference Ierror signal 758 is used to compute the duty cycle adjustment δD based on the Islope (signal 348), which is essentially the inverse of the derivative dI/dD. Via the generated duty cycle adjustment δD (signal 756), based on multiplying the signal 758 by the signal 348 via multiplier 717, the effective duty cycle Deff is determined in a similar manner to the voltage mode control, such as that shown and discussed in FIG. 5.

Effective Duty Cycle is Modified Based on Ictl as Follows:

$$D_{eff} = (T_0(1 + \delta t))(F_0(1 + \delta f) = D_0(1 + \delta D) = D_0(1 + (I_{ctl} - I_{feedback})I_{slope}))$$

Figure 8:
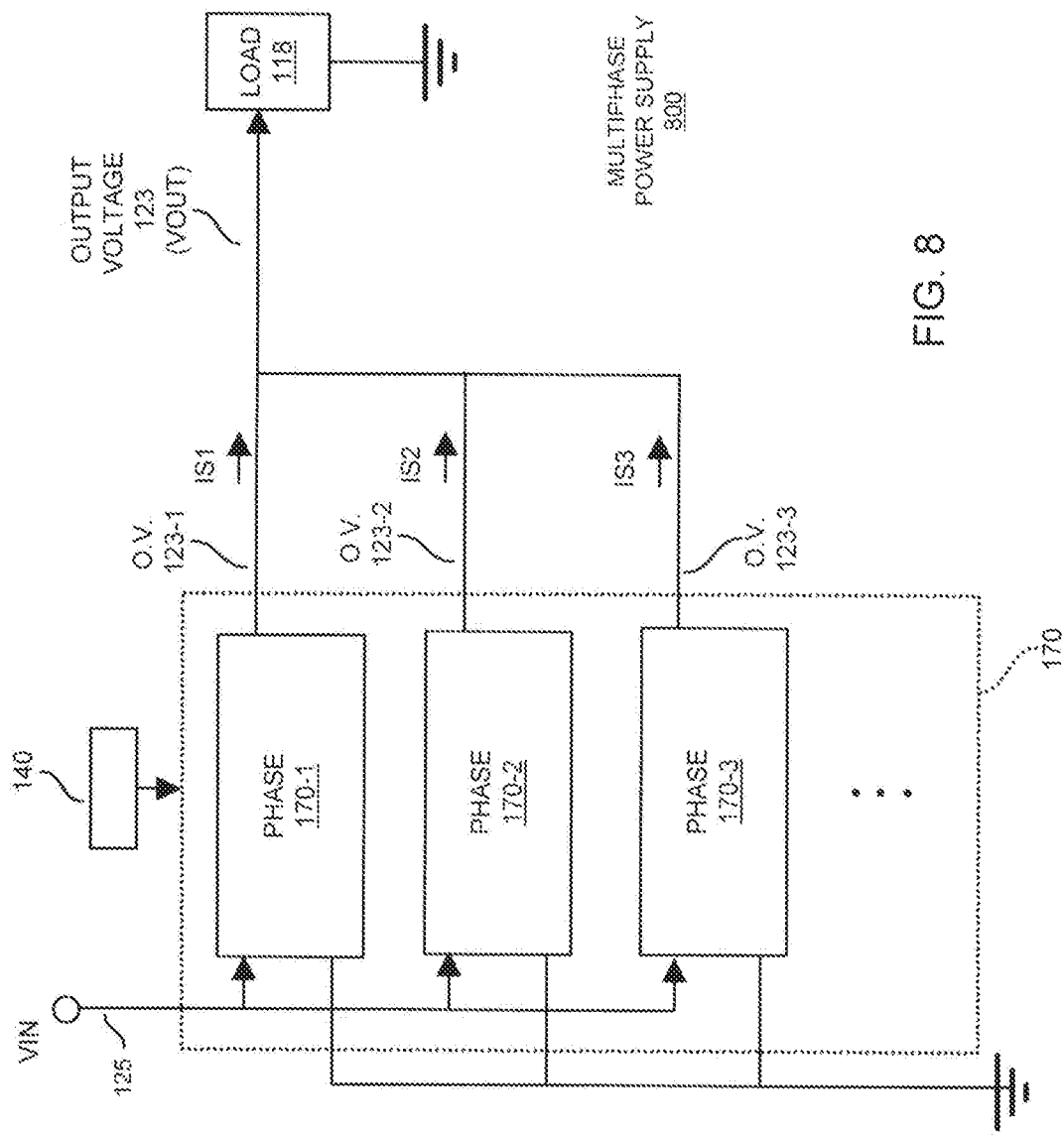
FIG. 8 is an example diagram illustrating the multiphase power supply and corresponding controller according to embodiments herein.

FIG. 8 is an example diagram illustrating components associated with a phase controller according to embodiments herein.

In one embodiment, the power supply 100/power supply 800 as described herein is implemented as a multiphase buck converter implementing multidimensional control (for example, combination of on-time and for switching frequency modulation in each phase).

Multiphase Buck Converters require high bandwidth control loops in order to maintain regulation, and especially in AVP systems, minimize voltage excursions and maintain flat closed loop output impedance over frequency. For example, in one embodiment, implementation of multiple phases includes interleaving operation of the phases to maintain ripple rejection, dynamic response; implementation of multiphase operation includes maintaining near fixed frequency behavior at steady state, maximizing efficiency and minimizing noise; implementation of multiphase operation includes use of variable frequency to improve dynamic response during transients; implementation of multiphase operation includes control that minimizes phase current imbalance during transient events.

More specifically, in further example embodiments, the power supply as described herein includes multiple phases 170-1, 170-2, etc. As shown, phase circuitry 170 of the multiphase power supply 800 (or 100) can be configured to include phase 170-1, phase 170-2, phase 170-3, etc.

Each of the phases (offset with respect to each other) contributes to supplying total current to the load 118. In a manner as previously discussed, the controller 140 produces modulation adjustment signals (modulation control signals) for each phase of the multiple phases. For example, based on the error voltage signal 137, the controller 140 produces first modulation adjustment signals such as a first frequency adjustment signal (such as one or more modulation control signals) and a first ON-time adjustment signal (such as one or more modulation control signals) for the first power supply phase 170-1; based on the error voltage signal 137, the controller 140 produces second modulation adjustment signals such as a second frequency adjustment signal (such as one or more modulation control signals) and a second ON-time adjustment signal (such as one or more modulation control signals) for a second power supply phase 170-2; based on the error voltage signal 137, the controller 140 produces third modulation adjustment signals such as a third frequency adjustment signal (such as one or more modulation control signals) and a third ON-time adjustment signal (such as one or more modulation control signals) for the third power supply phase 170-3; and so on.

Thus, in a similar manner as previously discussed, the controller circuitry 140 (in FIG. 1) or duplicate of controller circuitry 140 for each phase can be configured to operate each of the phases 170-1, 170-2, etc., in a modulation mode. In such an instance, each of the phases 170-1, 170-2, 173, etc., is configured in a similar manner as the single phase as shown in the previous FIGS. to contribute to generation of the output voltage 123.

Figure 9:
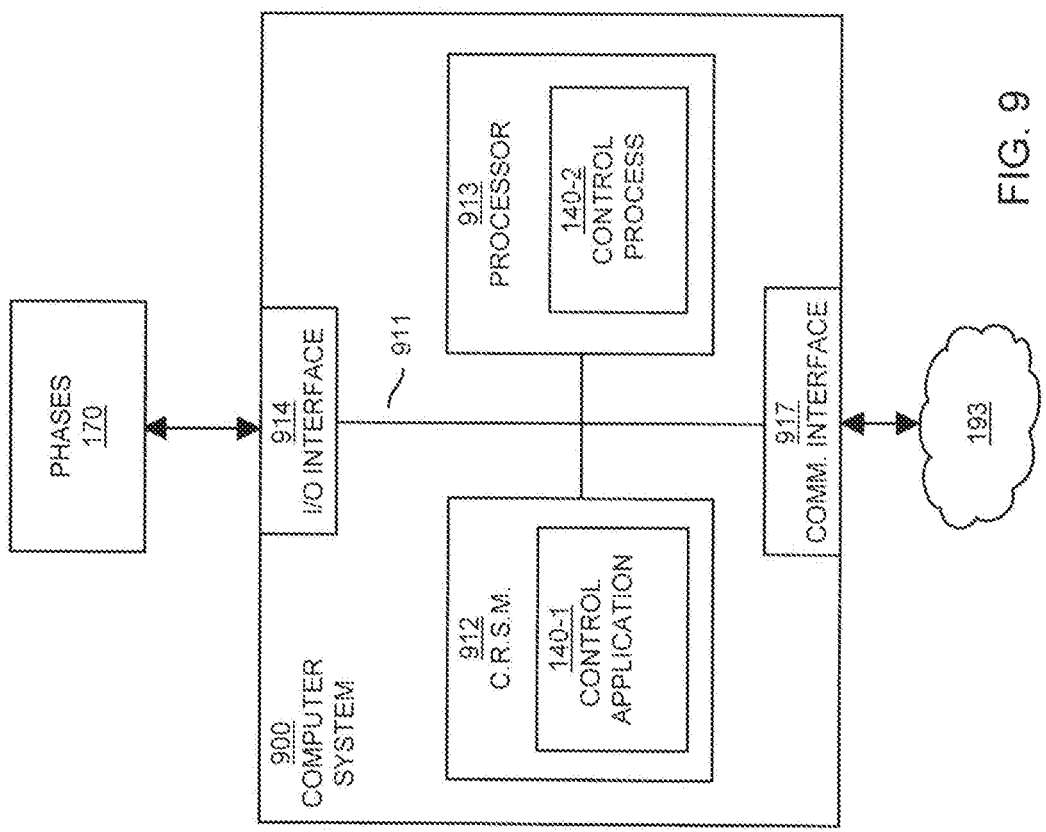
FIG. 9 is an example diagram illustrating computer processor hardware and related software instructions that execute methods according to embodiments herein.

FIG. 9 is an example block diagram of a computer device for implementing any of the operations as discussed herein according to embodiments herein.

As shown, computer system 900 (such as implemented by any of one or more resources as described herein such as error voltage generator 141, control function 142, PWM generator 143, etc.) of the present example includes an interconnect 911 that couples computer readable storage media 912 such as a non-transitory type of media (or hardware storage media) in which digital information can be stored and retrieved, a processor 913 (e.g., computer processor hardware such as one or more processor devices), I/O interface 914, and a communications interface 917.

I/O interface 914 provides connectivity to any suitable circuitry or component such as phases 170.

Computer readable storage medium 912 can be any hardware storage resource or device such as memory, optical storage, hard drive, floppy disk, etc. In one embodiment, the computer readable storage medium 912 stores instructions and/or data used by the controller application 140-1 to perform any of the operations as described herein.

Further in this example embodiment, communications interface 917 enables the computer system 900 and processor 913 to communicate over a resource such as network 190 to retrieve information from remote sources and communicate with other computers.

As shown, computer readable storage media 912 is encoded with controller application 140-1 (e.g., software, firmware, etc.) executed by processor 913. Controller application 140-1 can be configured to include instructions to implement any of the operations as discussed herein.

During operation of one embodiment, processor 913 accesses computer readable storage media 912 via the use of interconnect 911 in order to launch, run, execute, interpret or otherwise perform the instructions in controller application 140-1 stored on computer readable storage medium 912.

Execution of the controller application 140-1 produces processing functionality such as controller process 140-2 in processor 913. In other words, the controller process 140-2 associated with processor 913 represents one or more aspects of executing controller application 140-1 within or upon the processor 913 in the computer system 900.

In accordance with different embodiments, note that computer system 900 can be a micro-controller device, logic, hardware processor, hybrid analog/digital circuitry, etc., configured to control a power supply and perform any of the operations as described herein.

Functionality supported by the different resources will now be discussed via flowchart 1000 in FIG. 10. Note that the steps in the flowcharts below can be executed in any suitable order.

Figure 10:
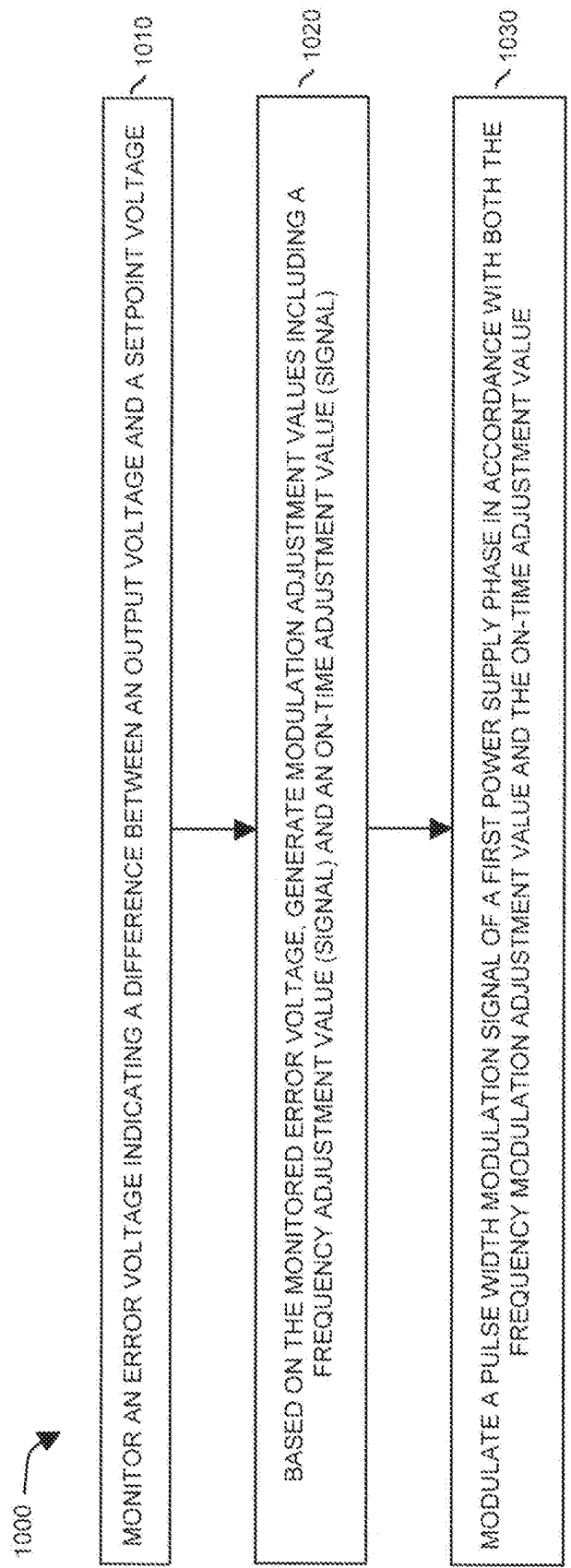
FIG. 10 is an example diagram illustrating a method according to embodiments herein.

FIG. 10 is an example diagram illustrating a method of controlling a power converter according to embodiments herein.

In processing operation 1010, the controller 140 monitors an error voltage indicating a difference between an output voltage and a setpoint voltage.

In processing operation 1020, based on the monitored error voltage, generating modulation adjustment values including a frequency adjustment value and an on-time adjustment value.

In processing operation 1030, the controller modulates a pulse width modulation signal of a first power supply phase in accordance with both the frequency modulation adjustment value and the on-time adjustment value.

FIG. 11 is an example diagram illustrating assembly of a control system (such as a circuit) according to embodiments herein.

In this example embodiment, assembler 1140 receives a substrate 1110 and corresponding components of system 100 such as one or more of controller 140, and corresponding components such as switches 121, inductors 144, etc. The assembler 1140 affixes (couples) the controller 140 and other components such as switches 121, inductors 144, etc., to the substrate 1110.

Via one or more respective circuit paths (such as traces, cables, wiring, etc.) as described herein, the fabricator 1140 provides connectivity between one or more components associated with the controller 140. Note further that components such as the controller 140 and corresponding components can be affixed or coupled to the substrate 1110 in any suitable manner. For example, one or more of the components in power supply 100 and/or controller 140 can be soldered to the substrate 1110, inserted into sockets disposed on the substrate 1110, etc.

Additionally, in one embodiment, the substrate 1110 is optional. Any of one or more circuit paths or connectivity as shown in the above drawings and as described herein can be disposed in cables, flexible substrates, or other suitable media.

In one nonlimiting example embodiment, the power supply 100 and/or components is/are disposed on its own assembly independent of substrate 1110; the substrate of the load 118 is directly or indirectly connected to the substrate 1110 via wires, cables, links, etc. The controller 140 or any portion of the power supply 100 can be disposed on a standalone smaller board plugged into a socket of the substrate 1110 as well.

As previously discussed, via one or more circuit paths 1122 (such as one or more traces, cables, connectors, wires, conductors, electrically conductive paths, etc.), the assembler 1140 couples the power supply 100 and corresponding components to the load 118. In one embodiment, the circuit path 1122 conveys current from an output voltage 123 to the load 118.

Accordingly, embodiments herein include a system comprising: a substrate 1110 (such as a circuit board, standalone board, mother board, standalone board destined to be coupled to a mother board, host, etc.); a power supply 100 including corresponding one or more components as described herein.

Note again that techniques herein are well suited for use in providing more efficient generation of an output voltage to drive a respective load. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
a controller operative to:
monitor an error voltage indicating a difference between an output voltage and a setpoint voltage;
based on the monitored error voltage, generate modulation adjustment signals including a frequency adjustment signal and an ON-time adjustment signal; and
modulate a pulse width modulation signal of a first power supply phase in accordance with both the frequency adjustment signal and the ON-time adjustment signal;
wherein the controller is further operative to: i) generate an ON-time setting from the ON-time adjustment signal; ii) generate a switching frequency setting from the frequency adjustment signal; and iii) modulate the pulse width modulation signal via the ON-time setting and the switching frequency setting.

2. The apparatus as in claim 1, wherein the controller is further operative to generate the modulation adjustment signals based on a magnitude of the error voltage.

3. The apparatus as in claim 1, wherein the controller is further operative to generate the modulation adjustment signals based on a frequency of the error voltage.

4. The apparatus as in claim 1, wherein the controller is further operative to concurrently: i) adjust a frequency of the pulse width modulation signal based on the frequency adjustment signal, and ii) adjust an ON-time of the pulse width modulation signal based on the ON-time adjustment signal.

5. The apparatus as in claim 1, wherein the modulation adjustment signals are first modulation adjustment signals;
wherein the frequency adjustment signal is a first frequency adjustment signal associated with the first power supply phase;
wherein the ON-time adjustment signal is a first ON-time adjustment signal associated with the first power supply phase;
wherein the controller is further operative to:
based on the monitored error voltage, generate second modulation adjustment signals including a second frequency adjustment signal and a second ON-time adjustment signal; and
modulate a second pulse width modulation signal of a second power supply phase in accordance with the second ON-time adjustment signal.

6. The apparatus as in claim 1, wherein the controller includes:
an accumulator operative to monitor passage of a period of the switching frequency signal; and
restart the pulse width modulation signal in response to comparing an output of the accumulator to a threshold signal.

7. A system comprising:
a circuit substrate;
the claim 1 coupled to the circuit substrate; and
wherein the controller controls the first power supply phase.

8. A method comprising:
receiving a circuit substrate; and
coupling the apparatus of claim 1 to the circuit substrate.

9. The method as in claim 1, wherein the controller includes:
via an accumulator, monitoring passage of a period of the switching frequency signal; and
restarting the pulse width modulation signal in response to detecting that an output of the comparator equals a threshold signal.

10. The apparatus as in claim 1, wherein the controller includes a first gain transfer function and a second gain transfer function;
wherein the first gain transfer function is operative to convert the monitored error voltage into the frequency adjustment signal; and
wherein the second gain transfer function is operative to convert the monitored error voltage into the ON-time adjustment signal.

11. The apparatus as in claim 1, wherein the controller includes a PID controller operative to produce a current target signal, the controller further operative to:
convert the current target signal into the modulation adjustment signals.

12. The apparatus as in claim 1, wherein the controller is further operative to:
map the error voltage into the modulation adjustment signals via a mapping function.

13. The apparatus as in claim 1, wherein the controller includes a PID controller operative to produce a target duty cycle, the controller further operative to:
convert the target duty cycle into the modulation adjustment signals.

14. An apparatus comprising:
a controller operative to:
monitor an error voltage indicating a difference between an output voltage and a setpoint voltage;
based on the monitored error voltage, generate modulation adjustment signals including a frequency adjustment signal and an ON-time adjustment signal; and
modulate a pulse width modulation signal of a first power supply phase in accordance with both the frequency adjustment signal and the ON-time adjustment signal;
wherein the controller includes a first gain transfer function and a second gain transfer function;
wherein the first gain transfer function is operative to convert the monitored error voltage into the frequency adjustment signal; and
wherein the second gain transfer function is operative to convert the monitored error voltage into the ON-time adjustment signal.

15. The apparatus as in claim 14, wherein the first gain transfer function and the second gain transfer function are correlated to each other to generate the pulse width modulation signal at different desired effective duty cycles over a range of different error voltages.

16. An apparatus comprising:
a controller operative to:
monitor an error voltage indicating a difference between an output voltage and a setpoint voltage;
based on the monitored error voltage, generate modulation adjustment signals including a frequency adjustment signal and an ON-time adjustment signal; and
modulate a pulse width modulation signal of a first power supply phase in accordance with both the frequency adjustment signal and the ON-time adjustment signal;
wherein the controller is further operative to:
i) generate a nominal frequency value to which the frequency adjustment signal is applied to produce a frequency setting at which to generate the pulse width modulation signal; and
ii) generate a nominal ON time value to which the ON-time adjustment signal is applied to produce an ON-time setting of the pulse width modulation signal.

17. An apparatus comprising:
a controller operative to:
monitor an error voltage indicating a difference between an output voltage and a setpoint voltage;
based on the monitored error voltage, generate modulation adjustment signals including a frequency adjustment signal and an ON-time adjustment signal;
modulate a pulse width modulation signal of a first power supply phase in accordance with both the frequency adjustment signal and the ON-time adjustment signal; and
wherein the controller includes a PID controller operative to produce a current target signal, the controller further operative to:
convert the current target signal into the modulation adjustment signals.

18. An apparatus comprising:
a controller operative to:
monitor an error voltage indicating a difference between an output voltage and a setpoint voltage;
based on the monitored error voltage generate modulation adjustment signals including a frequency adjustment signal and an ON-time adjustment signal; and
modulate a pulse width modulation signal of a first power supply phase in accordance with both the frequency adjustment signal and the ON-time adjustment signal;
wherein the controller is further operative to: map the error voltage into the modulation adjustment signals via a mapping function.

19. The apparatus as in claim 18, wherein the effective duty cycle, as-produced by the mapping function and modulation adjustment signals, relative to the error voltage is linear.

20. The apparatus as in claim 18, wherein the effective duty cycle, as-produced by the mapping function and modulation adjustment signals, relative to the error voltage is non-linear.

21. A method comprising:
monitoring an error voltage indicating a difference between an output voltage and a setpoint voltage;
based on the monitored error voltage, generating modulation adjustment signals including a frequency adjustment signal and an ON-time adjustment signal;
modulating a pulse width modulation signal of a first power supply phase in accordance with both the frequency adjustment signal and the ON-time adjustment signal;
via a first gain transfer function, converting the monitored error voltage into the frequency adjustment signal; and
via a second gain transfer function, converting the monitored error voltage into the ON-time adjustment signal.

22. The apparatus as in claim 21 further comprising:
generating the modulation adjustment signals based on a magnitude of the error voltage.

23. The method as in claim 21 further comprising:
generating the modulation adjustment signals based on a frequency of the error voltage.

24. The method as in claim 21, wherein the first gain transfer function and the second gain transfer function are correlated to each other to generate the pulse width modulation signal at desired effective duty cycles over a range of different error voltages.

25. The method as in claim 21 further comprising;
concurrently: i) adjusting a frequency of the pulse width modulation signal based on the frequency adjustment signal, and ii) adjusting an ON-time of the pulse width modulation signal based on the ON-time adjustment signal.

26. The method as in claim 21 further comprising:
generating a nominal frequency value to which the frequency adjustment signal is applied to produce a frequency setting at which to generate the pulse width modulation signal; and
generating a nominal ON time value to which the ON-time adjustment signal is applied to produce an ON-time setting of the pulse width modulation signal.

27. The method as in claim 21, wherein the modulation adjustment signals are first modulation adjustment signals;
wherein the frequency adjustment signal is a first frequency adjustment signal associated with the first power supply phase;
wherein the ON-time adjustment signal is a first ON-time adjustment signal associated with the first power supply phase;

the method further comprising:
- based on the monitored error voltage, generating second modulation adjustment signals including a second frequency adjustment signal and a second ON-time adjustment signal; and
- modulating a second pulse width modulation signal of a second power supply phase in accordance with the second ON-time adjustment signal.

28. The method as in claim 21 further comprising:
via a PID controller, producing a current target signal; and
converting the current target signal into the modulation adjustment signals.

29. The method as in claim 21 further comprising:
via mapping function, mapping the error voltage into the modulation adjustment signals.

30. The method as in claim 29, wherein the effective duty cycle produced by the mapping function and modulation adjustment signals relative to the error voltage is linear.

31. The method as in claim 29, wherein the effective duty cycle produced by the mapping function and modulation adjustment signals relative to the error voltage is non-linear.

32. The method as in claim 21 further comprising:
generating an ON-time setting from the ON-time adjustment signal;
generating a switching frequency setting from the frequency adjustment signal; and
modulating the pulse width modulation signal via the ON-time setting and the switching frequency setting.

33. An apparatus comprising:
a controller operative to:
- monitor an error voltage indicating a difference between an output voltage and a setpoint voltage;
- based on the monitored error voltage, generate modulation adjustment signals including a frequency adjustment signal and an ON-time adjustment signal;
- modulate a pulse width modulation signal of a first power supply phase in accordance with both the frequency adjustment signal and the ON-time adjustment signal; and
- wherein the controller is further operative to i) adjust an ON-time of the pulse width modulation signal based on the ON-time adjustment signal until the ON-time reaches a specified maximum value, and ii) adjust a frequency of the pulse width modulation signal based on the frequency adjustment signal if the ON-time has reached the specified maximum value.

34. An apparatus comprising:
a controller operative to:
- monitor an error voltage, indicating a difference between an output voltage and a setpoint voltage,
- based on the monitored error voltage, generate modulation adjustment signals including a frequency adjustment signal and an ON-time adjustment signal; and
- modulate a pulse width modulation signal of a first power supply phase in accordance with both the frequency adjustment signal and the ON-time adjustment signal;
wherein the controller includes a PID controller operative to produce a target duty cycle, the controller further operative to: convert the target duty cycle into the modulation adjustment signals.

* * * * *

UNITED STATES PATENT AND TRADEMARK OFFICE
CERTIFICATE OF CORRECTION

PATENT NO. : 11,502,602 B2
APPLICATION NO. : 17/070293
DATED : November 15, 2022
INVENTOR(S) : Benjamim Tang et al.

It is certified that error appears in the above-identified patent and that said Letters Patent is hereby corrected as shown below:

In the Claims

Column 24, Claim 7, Line 3, replace "claim" with --apparatus of claim--
Column 26, Claim 18, Line 5, replace "voltage" with --voltage,--
Column 26, Claim 19, Line 2, replace "as-produced with --as produced--
Column 26, Claim 20, Line 2, replace "as-produced" with --as produced--
Column 28, Claim 34, Line 3, replace "voltage," with --voltage--
Column 28, Claim 34, Line 4, replace "voltage," with --voltage;--

Signed and Sealed this
Thirty-first Day of January, 2023

Katherine Kelly Vidal
*Director of the United States Patent and Trademark Office*